(12) United States Patent
Oohira et al.

(10) Patent No.: US 10,513,045 B2
(45) Date of Patent: Dec. 24, 2019

(54) METHOD FOR PRODUCING SLIT SEPARATOR AND METHOD FOR PRODUCING SEPARATOR ROLL

(71) Applicant: Sumitomo Chemical Company, Limited, Chuo-ku, Tokyo (JP)

(72) Inventors: Satoshi Oohira, Osaka (JP); Tatsuya Kataoka, Niihama (JP); Kiyomu Nomura, Niihama (JP); Masaya Kondo, Niihama (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 41 days.

(21) Appl. No.: 15/324,816

(22) PCT Filed: Dec. 22, 2015

(86) PCT No.: PCT/JP2015/085842
§ 371 (c)(1),
(2) Date: Jan. 9, 2017

(87) PCT Pub. No.: WO2016/104507
PCT Pub. Date: Jun. 30, 2016

(65) Prior Publication Data
US 2017/0305025 A1     Oct. 26, 2017

(30) Foreign Application Priority Data

Dec. 25, 2014   (JP) .................................. 2014-263594
May 26, 2015   (WO) ................... PCT/JP2015/065010

(51) Int. Cl.
*B26D 1/02*     (2006.01)
*H01M 2/14*    (2006.01)
(Continued)

(52) U.S. Cl.
CPC ............... *B26D 1/025* (2013.01); *B26D 1/02* (2013.01); *B26D 1/03* (2013.01); *B26D 1/035* (2013.01);
(Continued)

(58) Field of Classification Search
CPC . B26D 1/02; B26D 1/025; B26D 1/03; B26D 1/035; B26D 1/151; B26D 1/24;
(Continued)

(56) References Cited

U.S. PATENT DOCUMENTS 4,275,629  A  *  6/1981  McDowell ............. B23D 25/12
                                                              83/302
2002/0132162 A1 *  9/2002  Takata ................... B26D 1/025
                                                              429/129
(Continued)

FOREIGN PATENT DOCUMENTS

CN       1714971 A      1/2006
CN      202753200 U     2/2013
(Continued)

OTHER PUBLICATIONS

Office Action dated Dec. 6, 2016 in U.S. Appl. No. 14/780,590.
(Continued)

*Primary Examiner* — Lingwen R Zeng
(74) *Attorney, Agent, or Firm* — Panitch Schwarze Belisario & Nadel LLP

(57) ABSTRACT

A good-quality slit separator having a small amount of fuzziness at a slit part thereof is to be obtained. The present invention includes: a step (S101) of conveying an original sheet (S); and a step (S102) of slitting the original sheet (S) by causing a plurality of slitting blades (72) to cut into the original sheet (S) such that tangent plane angles ($\theta_3$) in a
(Continued)

tangent plane, on which a slitting position is in contact with the original sheet (S), are substantially identical with each other.

11 Claims, 15 Drawing Sheets

(51) Int. Cl.
| | | |
|---|---|---|
| B26D 7/26 | (2006.01) | |
| H01M 2/16 | (2006.01) | |
| B26D 1/03 | (2006.01) | |
| B65H 35/02 | (2006.01) | |
| B65H 18/02 | (2006.01) | |
| B26D 1/24 | (2006.01) | |
| B26D 3/00 | (2006.01) | |
| B26D 1/15 | (2006.01) | |
| H01M 10/0525 | (2010.01) | |

(52) U.S. Cl.
CPC ............ *B26D 1/151* (2013.01); *B26D 1/24* (2013.01); *B26D 1/245* (2013.01); *B26D 3/00* (2013.01); *B26D 7/2614* (2013.01); *B65H 18/021* (2013.01); *B65H 35/02* (2013.01); *H01M 2/14* (2013.01); *H01M 2/145* (2013.01); *H01M 2/16* (2013.01); *H01M 2/1653* (2013.01); *H01M 2/1686* (2013.01); *B65H 2301/4148* (2013.01); *B65H 2301/41282* (2013.01); *B65H 2801/72* (2013.01); *H01M 10/0525* (2013.01)

(58) Field of Classification Search
CPC ........ B26D 1/245; B26D 3/00; B26D 7/2614; B65H 18/021; B65H 2301/41282; B65H 2301/4148; B65H 2801/72; B65H 35/02; H01M 10/0525; H01M 2/14; H01M 2/145; H01M 2/16; H01M 2/1653; H01M 2/1686
See application file for complete search history.

(56) References Cited

U.S. PATENT DOCUMENTS

| | | |
|---|---|---|
| 2006/0016308 A1 | 1/2006 | Katai et al. |
| 2012/0024123 A1 | 2/2012 | Nakajima et al. |
| 2012/0189815 A1 | 7/2012 | Matsui et al. |
| 2012/0193057 A1* | 8/2012 | Ohyabu ............... B26D 1/0006 162/283 |

FOREIGN PATENT DOCUMENTS

| | | |
|---|---|---|
| JP | H0715291 U | 3/1995 |
| JP | H8155886 A | 6/1996 |
| JP | H11144713 A | 5/1999 |
| JP | 2000-167794 A | 6/2000 |
| JP | 2002273684 A | 9/2002 |
| JP | 2010030035 A | 2/2010 |
| JP | 2011005585 A | 1/2011 |
| JP | 201120224 A | 2/2011 |
| JP | 2011159434 A | 8/2011 |
| JP | 2012157961 A | 8/2012 |
| JP | 2012174415 A | 9/2012 |
| JP | 2012232392 A | 11/2012 |
| JP | 2013119094 A | 6/2013 |
| JP | 2013243059 A | 12/2013 |
| JP | 2013254595 A | 12/2013 |
| JP | 2014180716 A | 9/2014 |
| KR | 20080077333 A | 8/2008 |
| KR | 20090034910 A | 4/2009 |
| WO | 2008013114 A1 | 1/2008 |
| WO | 2010119527 A1 | 10/2010 |
| WO | 2010137060 A1 | 12/2010 |

OTHER PUBLICATIONS

Office Action dated Jul. 26, 2016 in JP Application No. 2016-503250.
Int'l Search Report dated Mar. 22, 2016 in Int'l Application No. PCT/JP2015/085842.
Office Action dated Mar. 29, 2016 in JP Application No. 2016-503250.
Office Action dated Feb. 2, 2016 in JP Application No. 2015-527722.
Office Action dated Sep. 1, 2015 in JP Application No. 2015-527722.
Int'l Search Report dated Sep. 1, 2016 in Int'l Application No. PCT/JP2015/065010.
Office Action dated Feb. 1, 2017 in KR Application No. 10-2015-7026459.
Office Action dated Sep. 12, 2018 in CN Application No. 201580039324.9.
Office Action dated Jan. 19, 2017 in CN Application No. 201580000432.5.
Office Action dated Mar. 21, 2017 in KR Application No. 10-2016-7013981.
Int'l Preliminary Report on Patentability issued Jul. 6, 2017 in Int'l Application No. PCT/JP2015/065010.
Int'l Preliminary Report on Patentability issued Jul. 6, 2017 in Int'l Application No. PCT/JP2015/085842.
Office Action dated Apr. 25, 2019 in CN Application No. 201580039324.9.
Office Action dated Sep. 19, 2019 in CN Application No. 201580039324.9.

* cited by examiner

METHOD FOR PRODUCING SLIT SEPARATOR AND METHOD FOR PRODUCING SEPARATOR ROLL

CROSS-REFERENCE TO RELATED APPLICATION

This application is a section 371 of International Application No. PCT/JP2015/085842, filed Dec. 22, 2015, which was published in the Japanese language on Jun. 30, 3016, under International Publication No. WO2016/104507A1, and the disclosure of which is incorporated herein by reference.

TECHNICAL FIELD

The present invention, relates to (i) a method for producing a porous slit separator to be used for a battery such as a lithium-ion secondary battery, (ii) a method for producing a separator roll, which method employs the method for producing the porous slit separator, (iii) a method for slitting a separator, and (iv) a separator slitting apparatus.

BACKGROUND ART

A battery separator needs to be produced so as to have a width (hereinafter, referred to as "product width") that is suitable for a battery to be produced with the use of the separator. However, it is not efficient to produce a separator having such a product width at the time of production. Therefore, it is general practice to prepare a separator original sheet having a wide width, and then to simultaneously produce, by slitting the separator original sheet, a plurality of separators each having the product width.

Patent Literature 1 discloses a spot-type carbon dioxide laser cutting device as a device to slit a separator. Patent Literature 1 teaches using (i) a carbon dioxide laser oscillation unit and (ii) a mirror(s) for bending a laser beam (see paragraph [0050]).

Patent Literature 2 discloses a method for slitting a separator, which method employs a configuration in which a prescribed relationship is made between an angle between a razor blade and the separator and (ii) a thickness of the separator. Patent Literature 1 teaches that the configuration of Patent Literature 2 makes it unlikely that the separator would have pores and tears (see paragraph [0030]).

Note that a separator before being slit is referred to as "original sheet". Note also that a separator(s) after being slit is referred to as "slit separator".

CITATION LIST

Patent Literature

[Patent Literature 1]
Japanese Patent Application Publication Tokukai No. 2013-119094 (Publication date: Jun. 17, 2013)
[Patent Literature 2]
Japanese Patent Application Publication Tokukai No. 2002-273684 (Publication date: Sep. 25, 2002)

SUMMARY OF INVENTION

Technical Problem

However, the device disclosed in Patent Literature 1 requires including (i) the carbon dioxide laser oscillation unit and (ii) a mirror(s) for bending a laser beam. This causes the device to be large in size. The mirror, in particular, is required to be provided at each position at which the original sheet is slit. This makes it more difficult to use the device with a larger number of slit separators into which the original sheet is to be slit.

It can be said that the method disclosed in Patent Literature 2 can be used relatively easily even in a case where there is an increase in the number of slit separators into which the original sheet is slit. However, quality of a slit separator is not radically affected by (i) the angle between the razor blade and the separator or (ii) the thickness of the separator. Therefore, a good-quality slit separator is not necessarily obtained by use of the method of Patent Literature 2.

The original sheet is slit, by a plurality of slitting blades aligned in a width direction of the original sheet. However, Patent Literatures 1 and 2 do not teach a configuration for obtaining a good-quality slit separator with vise of a plurality of slitting blades.

The present invention has been made in view of the problem, and it is an object of the present invention to provide (i) a method for producing a slit separator, and (ii) a method for producing a separator roll, each of which method allows a good-quality slit separator and a good-quality separator roll to be obtained.

Solution to Problem

In order to attain the object, a slit separator production method in accordance with Aspect 1 of the present invention includes: a conveying step of conveying a battery separator original sheet which is porous; and a first slitting step of slitting the battery separator original sheet by causing a plurality of slitting blades to cut into the battery separator original sheet such that a plurality of slitting blade edge angles in a tangent plane, on which a slitting position is in contact with the battery separator original sheet, are substantially identical with each other.

A separator roll production method in accordance with Aspect 2 of the present invention includes: each of the steps recited in the slit separator production method; and a winding step of winding, around a core, a separator obtained by slitting the battery separator original sheet.

Advantageous Effects of Invention

Each of the aspects of the present invention brings about such an effect that it is possible to obtain, all at once, (i) a plurality of good-quality slit separators having a small amount of fullness at a slit part thereof and (ii) a good-quality separator roll having a side end surface on which there is a small amount of fuzziness.

DESCRIPTION OF EMBODIMENTS

[Common Configuration]

The following discusses in order a lithium-ion secondary battery, a separator, a heat resistant separator, a method for producing the heat resistant separator, a slitting apparatus, and a cutting device which are common to Embodiments discussed late.

(Lithium-Ion Secondary Battery)

A nonaqueous electrolyte secondary battery, typically, a lithium-ion secondary battery has a high energy density, and therefore, currently widely used not only as batteries for use in devices such as personal computers, mobile phones, and mobile information terminals, and for use in moving bodies such as automobiles and airplanes, but also as stationary batteries contributing to stable power supply.

Figure 1:
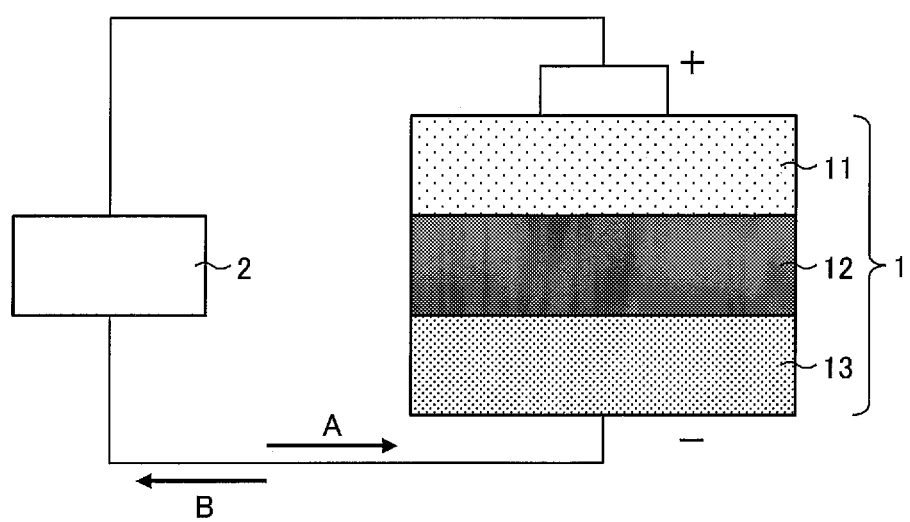
FIG. 1 is a schematic view illustrating a cross sectional configuration of a lithium-ion secondary battery.

FIG. 1 is a schematic view illustrating a cross sectional configuration of a lithium-ion secondary battery 1.

As illustrated in FIG. 1, the lithium-ion secondary battery 1 includes a cathode 11, a separator 12, and an anode 13. Between the cathode 11 and the anode 13, an external device 2 is connected outside the lithium-ion secondary battery 1. Then, while the lithium-ion secondary battery 1 is being charged, electrons move in a direction A. On the other hand, while the lithium-ion secondary battery 1 is being discharged, electrons move in a direction B.

(Separator)

The separator 12 is provided so as to be sandwiched between the cathode 11 which is a positive electrode of the lithium-ion secondary battery 1 and the anode 13 which is a negative electrode of the lithium-ion secondary battery 1. The separator 12 is a porous film that separates the cathode 11 and the anode 13, allowing lithium ions to move between the cathode 11 and the anode 13. The separator 12 contains, for example, polyolefin such as polyethylene or polypropylene as a material.

Figure 2:
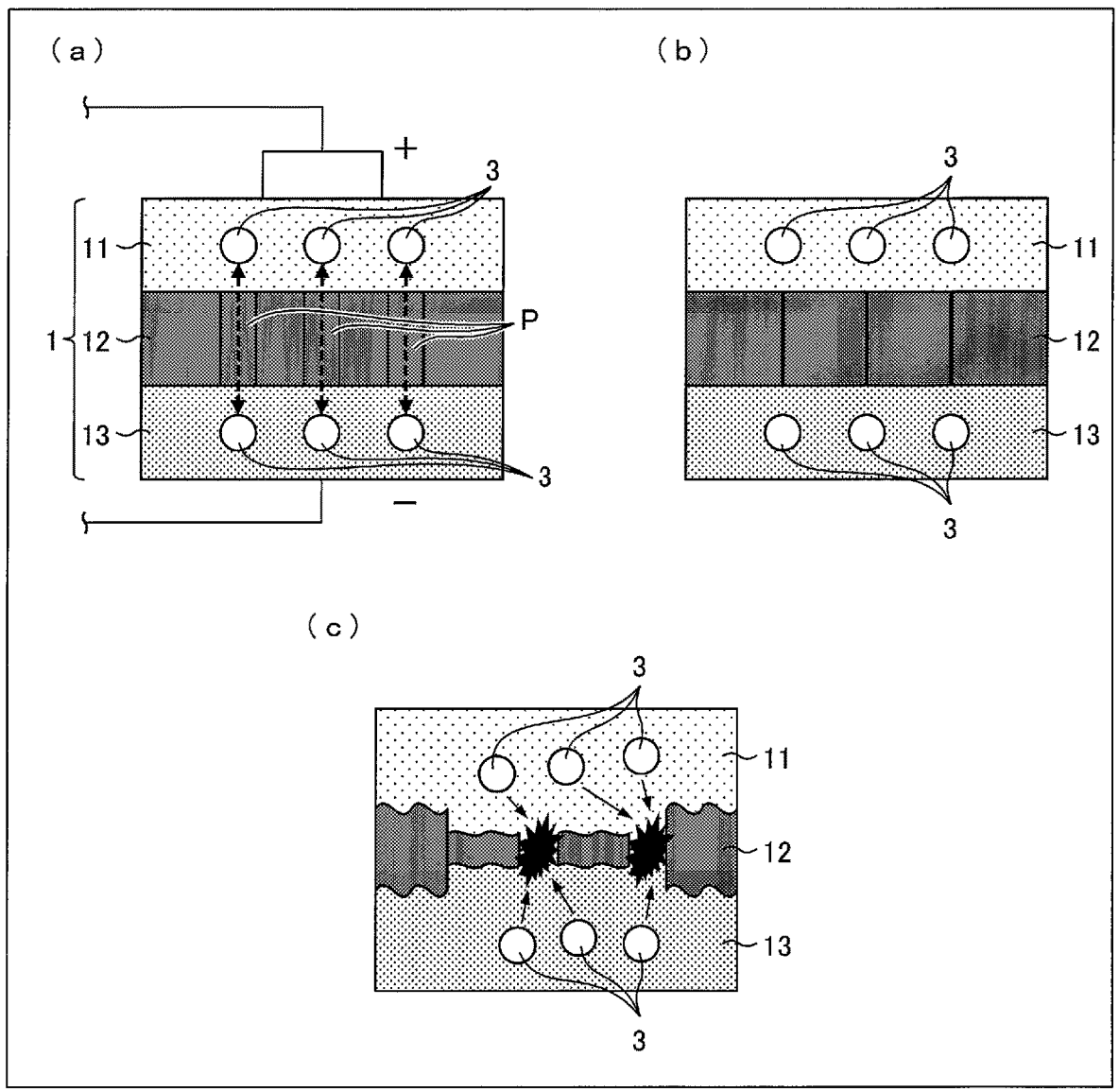
FIG. 2 is a schematic view illustrating details of the configuration of the lithium-ion secondary battery illustrated in FIG. 1.

FIG. 2 is a schematic view illustrating details of the configuration of the lithium-ion secondary battery 1 illustrated in FIG. 1. (a) of FIG. 2 illustrates a normal configuration. (b) of FIG. 2 illustrates a state in which a temperature of the lithium-ion secondary battery 1 has risen, (c) of FIG. 2 illustrates a state in which a temperature of the lithium-ion secondary battery 1 has sharply risen.

As illustrated in (a) of FIG. 2, the separator 12 is provided, with many pores P. Normally, lithium ions 3 in the lithium-ion secondary battery 1 can move back and forth through the pores P.

However, there are, for example, cases in which the temperature of the lithium-ion secondary battery 1 rises due to excessive charging of the lithium-ion secondary battery 1, a high current caused by short-circuiting of the external device, or the like. In such cases, the separator 12 melts or softens and the pores P are blocked as illustrated in (b) of FIG. 2. As a result, the separator 12 shrinks. This stops the above movement of the lithium ions 3, and consequently stops the above temperature rise.

However, in a case where a temperature of the lithium-ion secondary battery 1 sharply rises, the separator 12 suddenly shrinks. In this case, as illustrated in (c) of FIG. 2, the separator 12 may be destroyed. Then, the lithium ions 3 leak out from the separator 12 which has been destroyed. As a result, the lithium ions 3 do not stop moving. Consequently, the temperature continues rising.

(Heat Resistant Separator)

Figure 3:
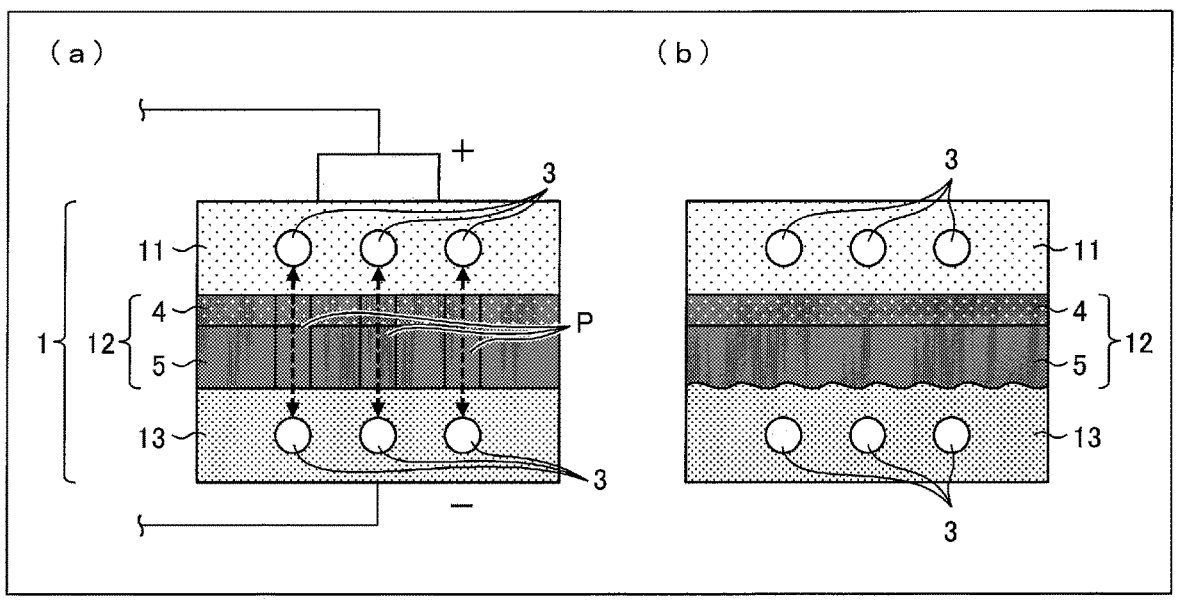
FIG. 3 is a schematic view illustrating another configuration of the lithium-ion secondary battery illustrated in FIG. 1.

FIG. 3 is a schematic view illustrating another configuration of the lithium-ion secondary battery 1 illustrated in FIG. 1. (a) of FIG. 3 illustrates a normal configuration, and (b) of FIG. 3 illustrates a state in which a temperature of the lithium-ion secondary battery 1 has sharply risen.

As illustrated in (a) of FIG. 3, the separator 12 can be a heat resistant separator that includes a porous film 3 and a heat resistant layer 4. The heat resistant layer 4 is laminated on a surface of the porous film 5 which surface is on a cathode 11 side. Note that the heat resistant layer 4 can alternatively be laminated on a surface of the porous film 5 which surface is on an anode 13 side, or both surfaces of the porous film 5. Further, the heat resistant layer 4 is provided with pores which are similar to the pores P. Normally, the lithium ions 3 move back and forth through the pores P and the pores of the heat resistant layer 4. The heat resistant layer 4 contains, for example, wholly aromatic polyamide (aramid resin) as a material.

As illustrated in (b) of FIG. 3, even in a case where the temperature of the lithium-ion secondary battery 1 sharply rises and as a result, the porous film 5 melts or softens, the shape of the porous film 5 is maintained because the heat resistant layer 4 supports the porous film 5. Therefore, such a sharp temperature rise results in only melting or softening of the porous film 5 and consequent blocking of the pores P. This stops movement of the lithium ions 3 and consequently stops the above-described excessive discharging or excessive charging. In this way, the porous film 5 can be prevented from being destroyed.

(Production Steps of the Heat Resistant Separator)

How to produce the heat resistant separator of the lithium-ion secondary battery 1 is not specifically limited. The heat resistant separator 12 can be produced by a well-known method. The following discussion assumes a case where the porous film 5 contains polyethylene as a main material. However, even in a case where the porous film 5 contains another material, the similar steps can still be applied to production of the separator 12.

For example, it is possible to employ a method including the steps of first forming a film by adding a plasticizer to a thermoplastic resin, and then removing the plasticizer with an appropriate solvent. For example, in a case where the porous film 5 is made of a polyethylene resin containing ultrahigh molecular weight polyethylene, it is possible to produce the porous film 5 by the following method.

This method includes (1) a kneading step of obtaining a polyethylene resin composition by kneading a ultrahigh molecular weight polyethylene and an inorganic filler such as calcium carbonate, (2) a rolling step of forming a film with the polyethylene resin composition, (3) a removal step of removing the inorganic filler from the film obtained in the step (2), and (4) a stretching step of obtaining the porous film 5 by stretching the film obtained in the step (3).

In the removal step, many fine pores are provided in the film. The fine pores of the film stretched in the stretching step become the above-described pores P. The porous film 5 formed as a result is a polyethylene microporous film having a prescribed thickness and a prescribed air permeability.

Note that in the kneading step, 100 parts by weight of the ultrahigh molecular weight polyethylene, 5 parts by weight to 200 parts by weight of a low-molecular weight polyolefin having a weight-average molecular weight of 10000 or less, and 100 parts by weight to 400 parts by weight of the inorganic filler can be kneaded.

Thereafter, in a coating step, the heat resistant layer 4 is formed on a surface of the porous film 5. For example, on the porous film 5, an aramid/NMP (N-methylpyrrolidone) solution (coating solution) is applied, and thereby, the heat resistant layer 4 that is an aramid heat resistant layer is formed. The heat resistant layer 4 can be provided on only one surface or both surfaces of the porous film 5. Alternatively, for coating, the heat resistant layer 4 can he formed by using a mixed solution containing a filler such as alumina/carboxymethyl cellulose.

A method for coating the porous film 5 with a coating solution is not specifically limited as long as uniform wet coating can be performed by the method. The method can be a conventionally well-known method such as a capillary coating method, a spin coating method, a slit die coating method, a spray coating method, a dip coating method, a roll coating method, a screen printing method, a flexo printing method, a bar coater method, a gravure coater method, or a die coater method. The heat resistant layer 4 has a thickness which can be controlled by (i) a thickness of a coating wet film and (ii) a solid-content concentration in the coating solution.

It is possible to use a resin film, a belt, a metal drum or the like as a support with which the porous film 5 is fixed or transferred in coating.

As described above, it is possible to produce the separator 12 (heat resistant separator) in which the heat resistant layer 4 is laminated on the porous film 5. Thus produced separator is wound on a cylindrical core. Note that a subject to be produced by the above production method is not limited to the heat resistant separator. The above production method does not necessarily include the coating step. In a case where the method includes no coating step, the subject to be produced is a separator including no heat resistant layer.

(Slitting Apparatus)

The heat resistant, separator or the separator including no heat resistant layer (hereinafter, referred to as "separator") preferably has a width (hereinafter, referred to as "product width") suitable for application products such as the lithium-ion secondary battery 1. However, for improving productivity, the separator is produced so as to have a width that is equal to or larger than a product width. Then, after having been once produced so as to have a width equal to or larger than the product width, the separator is slit into a separator(s) having the product width.

Note that the "separator width" means a dimension of the separator in a direction perpendicular to a lengthwise direction and a thicknesswise direction of the separator. In the description below, a wide separator having not yet been slit is referred to as an "original sheet" while particularly a separator having been slit is referred to as a "slit separator". Note also that slitting means to slit the separator in the lengthwise direction (flow direction of the film during production; MD: Machine direction), and that cutting means to slit the separator in a transverse direction (TD). The transverse direction (TD) means a direction which is substantially perpendicular to the lengthwise direction (MD) and the thicknesswise direction of the separator.

Figure 4:
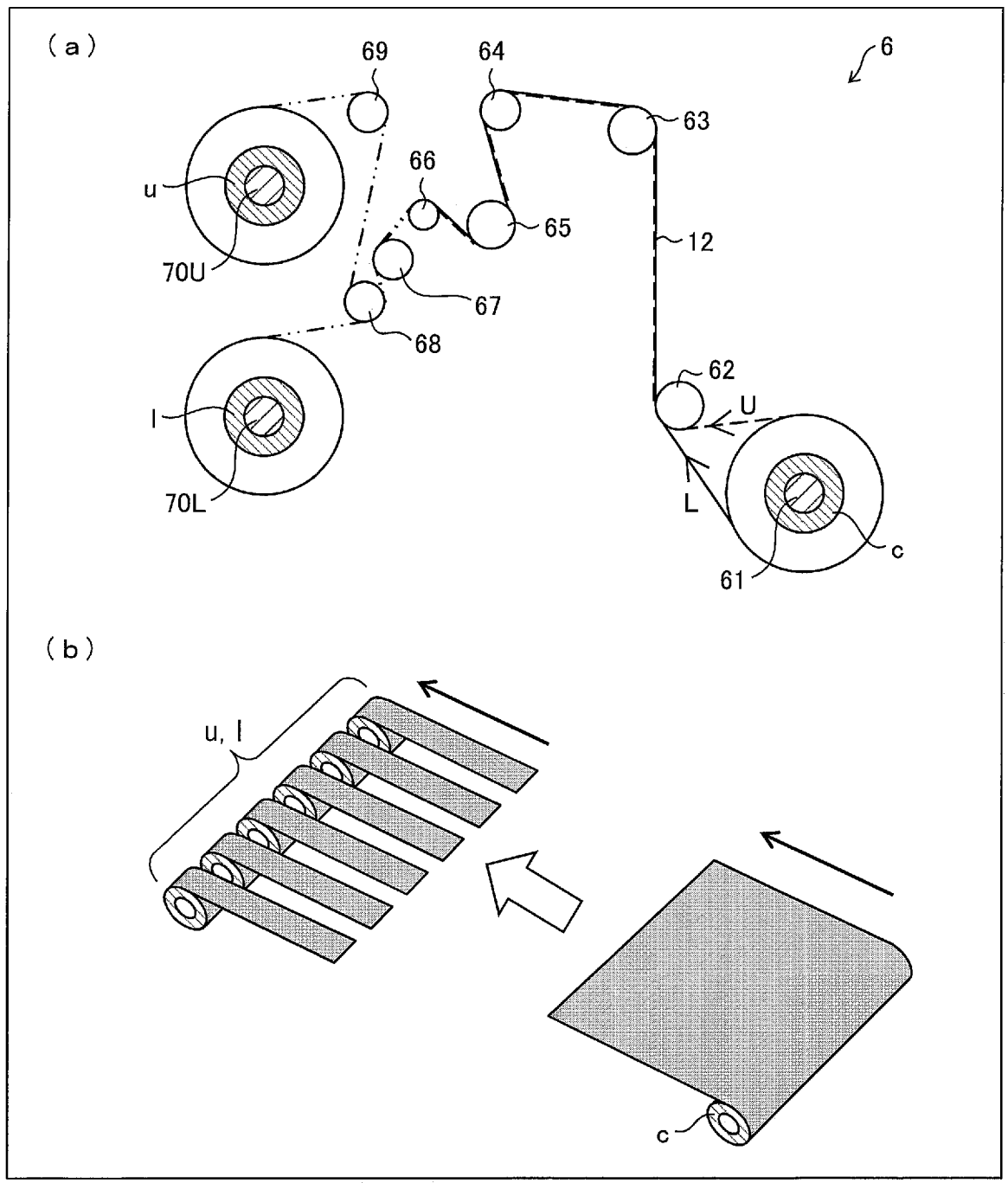
FIG. 4 is a schematic view illustrating a configuration of a slitting apparatus for slitting the separator.

FIG. 4 is a schematic view illustrating a configuration of a slitting apparatus 6 for slitting the separator. (a) of FIG. 4 illustrates an entire configuration, and (b) of FIG. 4 illustrates an arrangement before and after slitting the original sheet.

As illustrated in (a) of FIG. 4, the slitting apparatus 6 includes a rotatably-supported cylindrical wind-off roller 61, rollers 62 to 69, and take-up rollers 70U and 70L. The slitting apparatus 6 is further provided with cutting devices 7 described later.

(Before Slitting)

In the slitting apparatus 6, a cylindrical core c on which the original sheet is wrapped is fit on the wind-off roller 61. As illustrated in (b) of FIG. 4, the original sheet is wound off from the core c to a route U or L. Thus unwound original sheet is conveyed to the roller 68 via the rollers 63 to 67. In the step of conveying the unwound original sheet, the original sheet is slit into slit separators. Note that the roller 67 does not need to be provided. In such a case, the original sheet is conveyed from the roller 64 to the roller 68.

(After Slitting)

As illustrated in (b) of FIG. 4, some of the slit separators are wound on cylindrical cores u (bobbins) fit on take-up rollers 70U, respectively. Meanwhile, the others of the slit separators are wound on cylindrical cores 1 (bobbins) fit on take-up rollers 70L, respectively. Note that each of combinations of the slit separators each wound into a roll form and the corresponding cores u and 1 is referred to as a "roll".

(Cutting Device)

Figure 5:
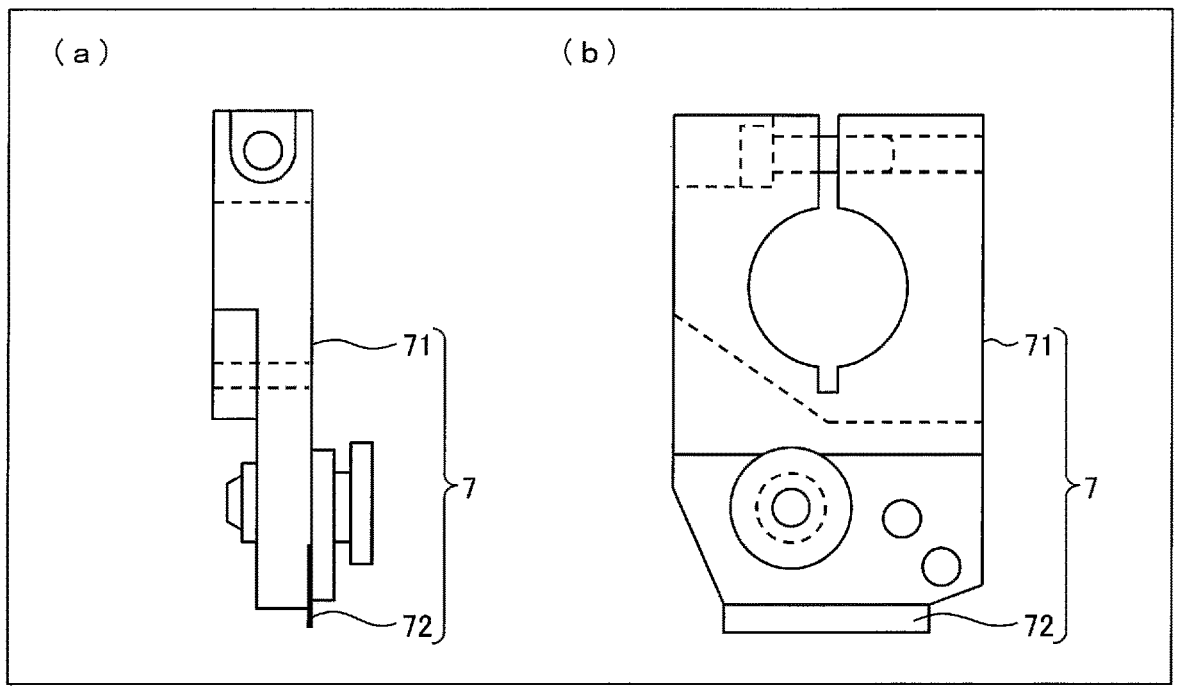
FIG. 5 is a combination of a side view and a front view illustrating a configuration of a cutting device of the slitting apparatus illustrated in FIG. 4.

FIG. 5 is a view illustrating a configuration of each of the cutting devices 7 of the slitting apparatus 6 as illustrated in (a) of FIG. 4. (a) of FIG. 5 is a side view of the cutting device 7, and (b) of FIG. 5 is a front view of the cutting device 7.

As illustrated in (a) and (b) of FIG. 5, each of the cutting devices 7 includes a holder 71 and a slitting blade 72. The holder 71 is fixed to a housing or the like provided in the slitting apparatus 6. The holder 71 holds the slitting blade 72 in a manner such that the slitting blade 72 and the original sheet of the separator being conveyed have a fixed positional relation. The slitting blade 72 (i) has a finely sharpened edge and (ii) slits the original sheet of the separator by using the edge.

[Embodiment 1]

The following discusses an embodiment of the present invention with reference to FIGS. 6 to 9.

<Separator Slitting Method>

(Cutting of Original Sheet by Slitting Blade)

Figure 6:
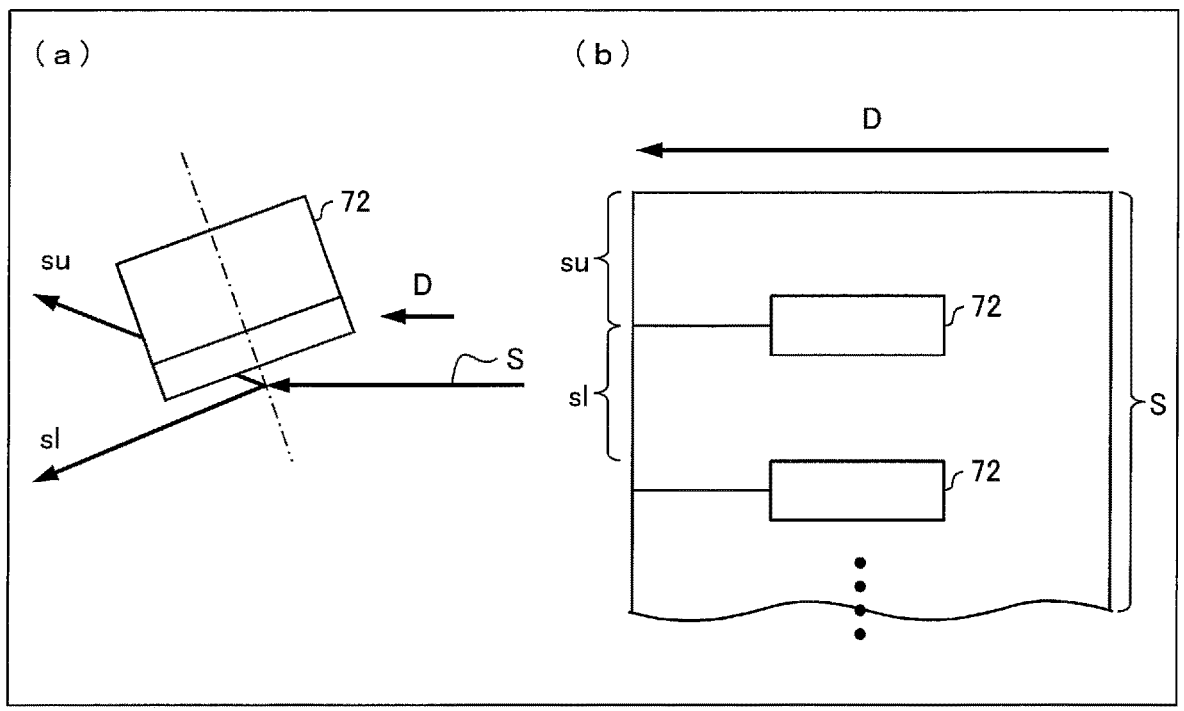
FIG. 6 is a schematic view illustrating a separator slitting method in accordance with Embodiment 1.

FIG. 6 is a schematic view illustrating a separator slitting method in accordance with Embodiment 1. (a) of FIG. 6 is a front view. (b) of FIG. 6 is a top view.

As illustrated in (a) of FIG. 6, an original sheet S is conveyed along a set conveyance route up to the blade edges of the slitting blades 72. The slitting blades 72 slit the original sheet S into slit separators su and slit separators s1. The slit separators su and the slit separators s1 are conveyed in respective directions.

As illustrated in (b) of FIG. 6, the original sheet S is conveyed in a single direction D. The slitting blades 72 cut in the original sheet S (i) parallel to the direction D and (ii) perpendicularly to the original sheet S.

The original sheet S is a separator immediately before being slit by the slitting blades 72.

(Cross-Sectional Angle of Slitting Blade)

Figure 7:
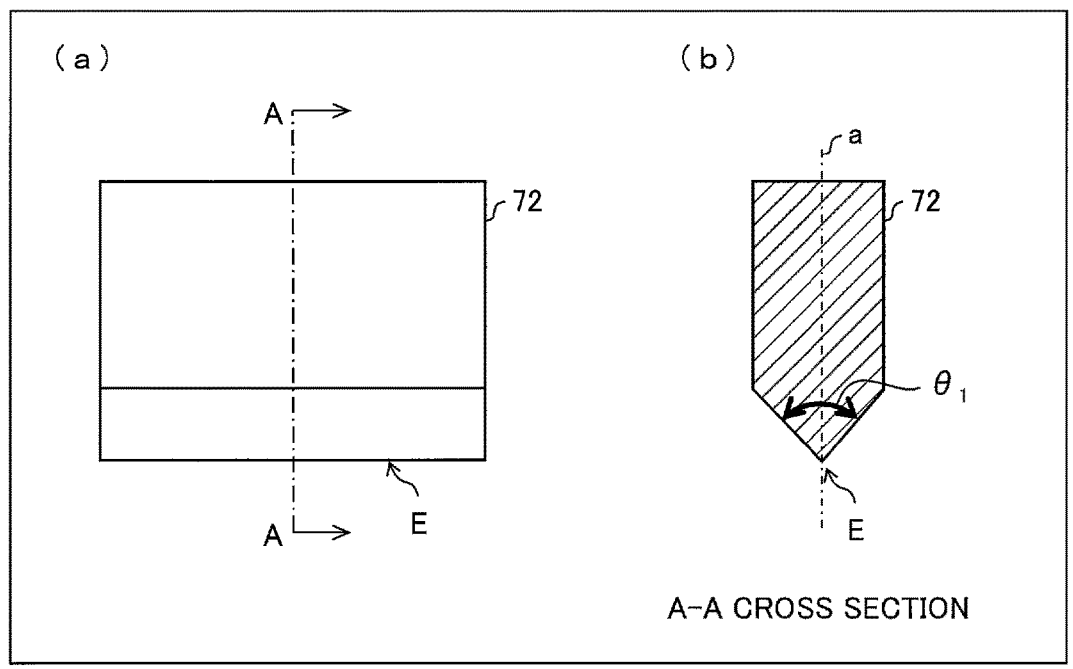
FIG. 7 is a combination of a front view and a cross-sectional view illustrating a configuration of each of slitting blades for use in the separator slitting method illustrated in FIG. 6.

FIG. 7 is a view illustrating a configuration of each of the slitting blades 72 for use in the separator slitting method illustrated in (a) and (b) of FIG. 6. (a) of FIG. 7 is a front view. (b) of FIG. 7 is a cross-sectional view taken along the line A-A. illustrated in (a) of FIG. 7.

As illustrated in (a) of FIG. 7, the slitting blade 72 includes the Linear blade edge E. As illustrated in (b) of FIG. 7, the shape of the slitting blade 72 is plane-symmetrical with respect to a plane a which is perpendicular to the original sheet S and to the cross section taken along the line A-A (hereinafter, referred to as "A-A cross section"). Then, in the A-A cross section, the slitting blade 72 expands from the blade edge E as a tip so as to have a prescribed angle. A cross-sectional angle $\theta_1$ of the cross section perpendicular to the blade edge E is, for example, 25°.

(Mounting Angle of Slitting Blade)

Figure 8:
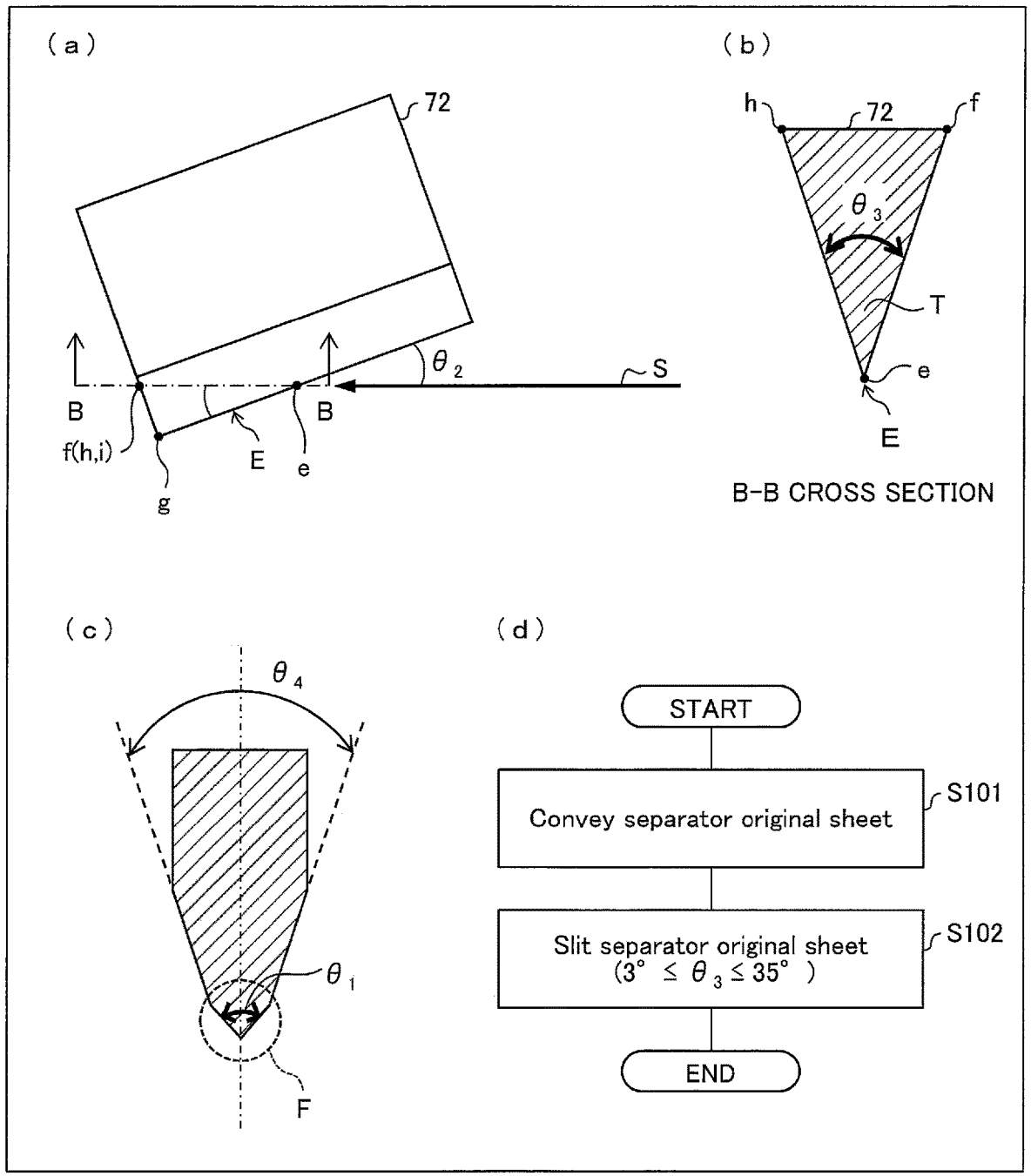
FIG. 8 is a combination of a front view and cross-sectional views illustrating details of the configuration of the slitting blade illustrated in FIG. 7.

FIG. 8 is a set of views illustrating details of the configuration of the slitting blade 72 illustrated in (a) and (b) of FIG. 7. (a) of FIG. 8 is a front view. (b) of FIG. 8 is a cross-sectional view taken along the line B-B in (a) of FIG. 8. (c) of FIG. 8 is a cross-sectional view taken along the line A-A in a case where the slitting blade 72 is a two-stage edge. (d) of FIG. 8 is a flow chart, illustrating the separator slitting method in which the slitting blade 72 is used.

As illustrated in (a) of FIG. 8, the slitting blade 72 is mounted at a prescribed angle with respect to the original sheet S. A mounting angle $\theta_2$ is, for example, 12.8°.

A cross section taken along the line B-B (hereinafter, referred to as "B-B cross section") is a tangent plane on which a slitting position of the slitting blade 72 in contact with the original sheet S.

(Tangent-Plane Blade Edge Angle of Slitting Blade)

As illustrated in (b) of FIG. 8, in the cross section T (tangent plane) which is the B-B cross section, the slitting blade 72 expands from the blade edge E as a tip so as to have a prescribed angle. The angle is a cross-sectional angle on a plane including the original sheet S with which the blade edge E is in contact (the angle is hereinafter referred to as "tangent-plane blade edge angle"). The inventors found that the tangent-plane blade edge angle largely affects quality of a slit separator. In a case where the tangent-plane blade edge angle $\theta_3$ is in a range of not less than 3° to not more than 35° (hereinafter, referred to as "range α"), it is possible to obtain a good-quality slit separator having a small amount of fuzziness at a slit part thereof.

(Two-Stage Edge)

As illustrated in (c) of FIG. 8, the slitting blades 72 can each be a two-stage edge. The blade edge E of the two-stage edge expands at a cross-sectional angle $\theta_1$ (first stage), and then expands at a cross.-sectional angle $\theta_4$ which is narrower than the cross-sectional angle $\theta_1$ (second stage). Even in a case of the two-stage edge, the tangent-plane blade edge angle $\theta_3$ can be calculated as described above in a small area indicated by an area F.

(Flow of Separator Slitting Method)

As illustrated in (d) of FIG. 8, the separator slitting method in accordance with Embodiment 1 includes (i) a step S101 of conveying the original sheet S and (ii) a step S102 of slitting the original sheet S. In so doing, the tangent-plane blade edge angle $\theta_3$ falls within the range α.

(Relationship Between (i) Cross-Sectional Angle and Mounting Angle and (ii) Tangent-Plane Blade Edge Angle)

Figure 9:
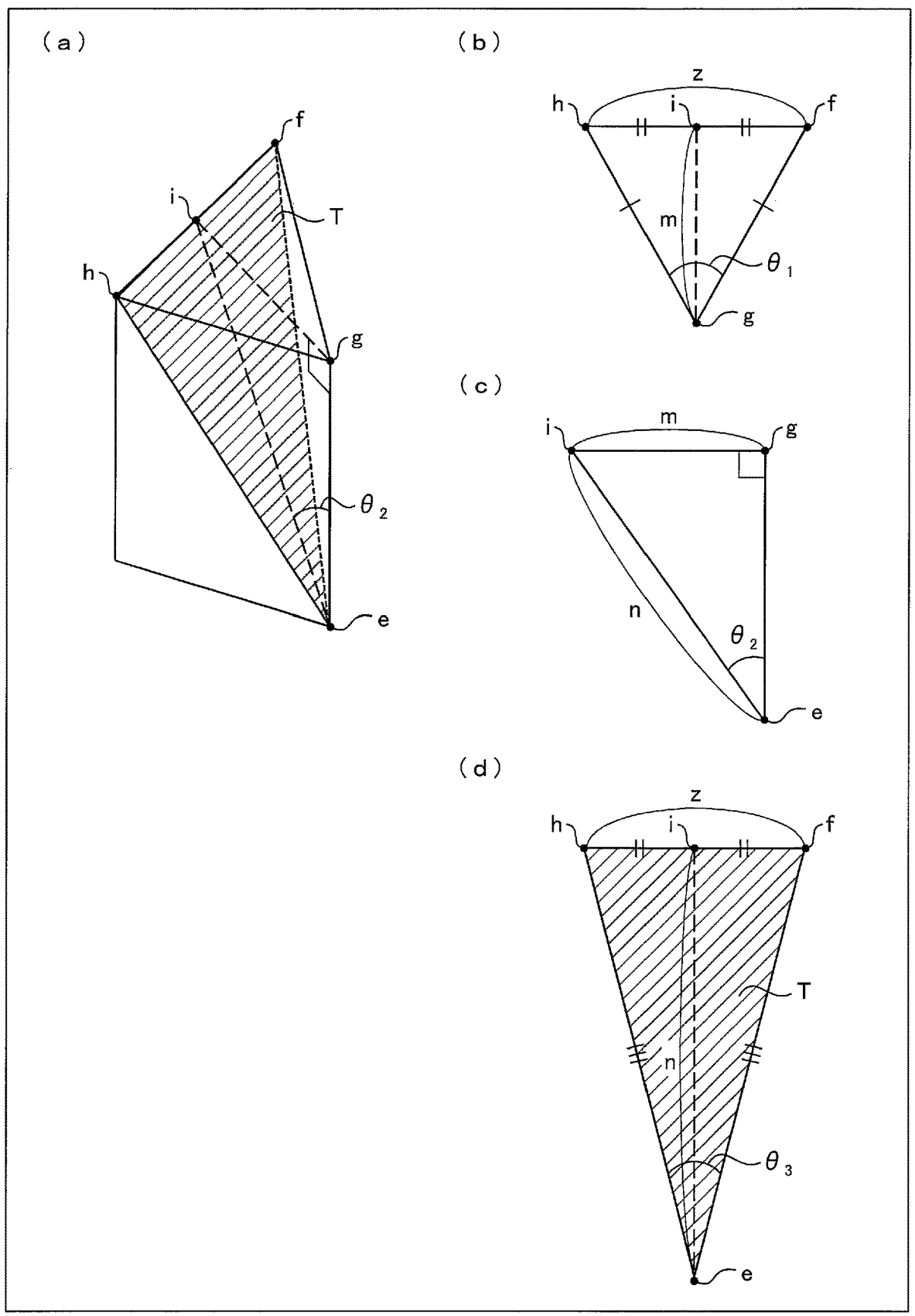
FIG. 9 is a set of schematic views illustrating a relationship between (i) a cross-sectional angle and a mounting angle of the slitting blade illustrated in FIG. 8 and (ii) a tangent-plane blade edge angle.

(a) through (d) of FIG. 9 are a set of schematic views illustrating a relationship between (i) the cross-sectional angle $\theta_1$ and the mounting angle $\theta_2$ of the slitting blade 72 illustrated in (a) and (b) of FIG. 8 and (ii) the tangent-plane blade edge angle $\theta_3$ of the slitting blade 72 illustrated in (a) and (b) of FIG. 8. Points e to i shown in (a) through (d) of FIG. 9 respectively correspond to points e to i shown in (a) through (d) of FIG. 8.

As illustrated in (a) of FIG. 9, the blade edge E can be regarded as a triangular prism within a small area (e.g. the area F described above). Hereinafter, the blade edge E will be referred to as "triangular prism".

(Cross-Sectional Angle and Mounting Angle)

As illustrated in (b) of FIG. 9, the above-described cross-sectional angle $\theta_1$ corresponds to an angle at the point g of a triangle having the points f, g and h which are vertices of the triangular prism. The following Formula (1) concerning the cross-sectional angle $\theta_1$ can be obtained:

$$z/2 = m \cdot \tan(\theta_1/2) \quad \text{Formula (1)}$$

where (i) the point i is a middle point between the points f and h, (ii) a length of a side between the points f and h is z, and (iii) a length of a line segment between the points g and i is m.

As illustrated in (c) of FIG. 9, the above-described mounting angle $\theta_2$ corresponds to an angle at the point e of a triangle having (i) the points e and g which are vertices of the triangular prism and (ii) the point i. The following Formula (2) concerning the mounting angle $\theta_2$ can be obtained:

$$m/n = \sin(\theta_2) \quad \text{Formula (2)}$$

where a length of a side between the points e and i is n.

(Tangent-Plane Blade Edge Angle)

(d) of FIG. 9 illustrates the cross section T illustrated in (b) of FIG. 8. Then, the following Formula (3) concerning the tangent-plane blade edge angle $\theta_3$ can be obtained:

$$\tan(\theta_3/2) = (z/2)/n \quad \text{Formula (3).}$$

By substituting the above Formula (1) into the above Formula (3), the following Formula (4) can be obtained:

$$\tan(\theta_3/2) = (m/n) \cdot \tan(\theta_1/2) \quad \text{Formula (4)}$$

By substituting the above Formula (2) into the above Formula (4), the following Formula (5) can be obtained:

$$\tan(\theta_3/2) = \sin(\theta_2) \cdot \tan(\theta_1/2) \quad \text{Formula (5)}$$

By modifying the above Formula (5), the following Formula (6) can be obtained:

$$\theta_3 = 2 \cdot \tan^{-1}(\sin(\theta_2) \cdot \tan(\theta_1/2))  \quad \text{Formula (6)}$$

(Concrete Example of Slitting Blade)

As a slitting blade 72, an industrial precision knife "FBC4019G" manufactured by Kyocera Corporation, for example, can be used. The specifications of FBC4019G are as follows:

Material: FW25 (material constituted by an assembly of fine particles)
Vickers hardness [Kg/mm$^2$]: 1700
Transverse intensity [MPa]: 3900
Fracture toughness [MPa·m$^{1/2}$]: 10.3
Linear expansion coefficient [1/° C.(×10$^{-6}$)]: 5.5
Particle size [μm] of particles constituting blade edge E: 0.6
Length of blade edge E [mm]: 40
Width [mm]: 19
Thickness [mm]: 0.25
Cross-sectional angle $\theta_1$ [°] of blade edge E: 25

<<Effect of Embodiment 1>>

The tangent-plane blade edge angle $\theta_3$ is an angle at which a slitting blade 72 cuts in an original sheet S when slitting the original sheet S. Therefore, the tangent-plane blade edge angle $\theta_3$ largely affects quality of a slit separator. Then, in a case where the tangent-plane blade edge angle $\theta_3$ falls within the above-described range α, it is possible to obtain a good-quality slit separator.

The present invention also encompasses a slitting apparatus 6 (see (a) of FIG. 4) that includes cutting devices 7 (see (a) and (b) of FIG. 5) each including a slitting blade. A slitting blade 72 fixed by a holder 71 is encompassed in the present invention as the tangent-plane blade edge angle $\theta_3$ is encompassed in the above-described range α.

(Equivalent Conditions Producing Same Effect)

The cross-sectional angle $\theta_1$ and the mounting angle $\theta_2$ only need to be in a range of values derived from a relationship represented by the above Formula (5) while the tangent-plane blade edge angle $\theta_3$ falls within the range α. In such a case also, it is possible to obtain a good-quality slit separator.

(Effect Obtained by Shape of Slitting Blade)

As has been described, the shape of each of the slitting blades 72 is plane-symmetrical with respect to the plane a which is perpendicular to the original sheet S and to the A-A cross section (see (a) and (b) of FIG. 7). That is, the cross-sectional shape of each of the slitting blades 72 is plane-symmetrical with respect to a plane, the plane being (i) perpendicular to a plane including the original sheet S (plane on which the blade edge E is in contact with the original sheet S) and (ii) parallel to the direction D which is a conveyance direction in which the original sheet S is conveyed. This makes it possible to obtain slit separators having respective end surfaces which have uniform shapes.

(Slit separator production method, separator roll production method, and use as slitting apparatus)

The present invention also encompasses a slit separator production method including each step involved in the above-described separator slitting method.

The present invention also encompasses a separator roll production method including each step involved in the above-described separator slitting method.

The present invention also encompasses the slitting apparatus 6 (separator slitting apparatus) which realizes the above-described separator slitting method.

(Appearance of Fuzziness)

Figure 15:
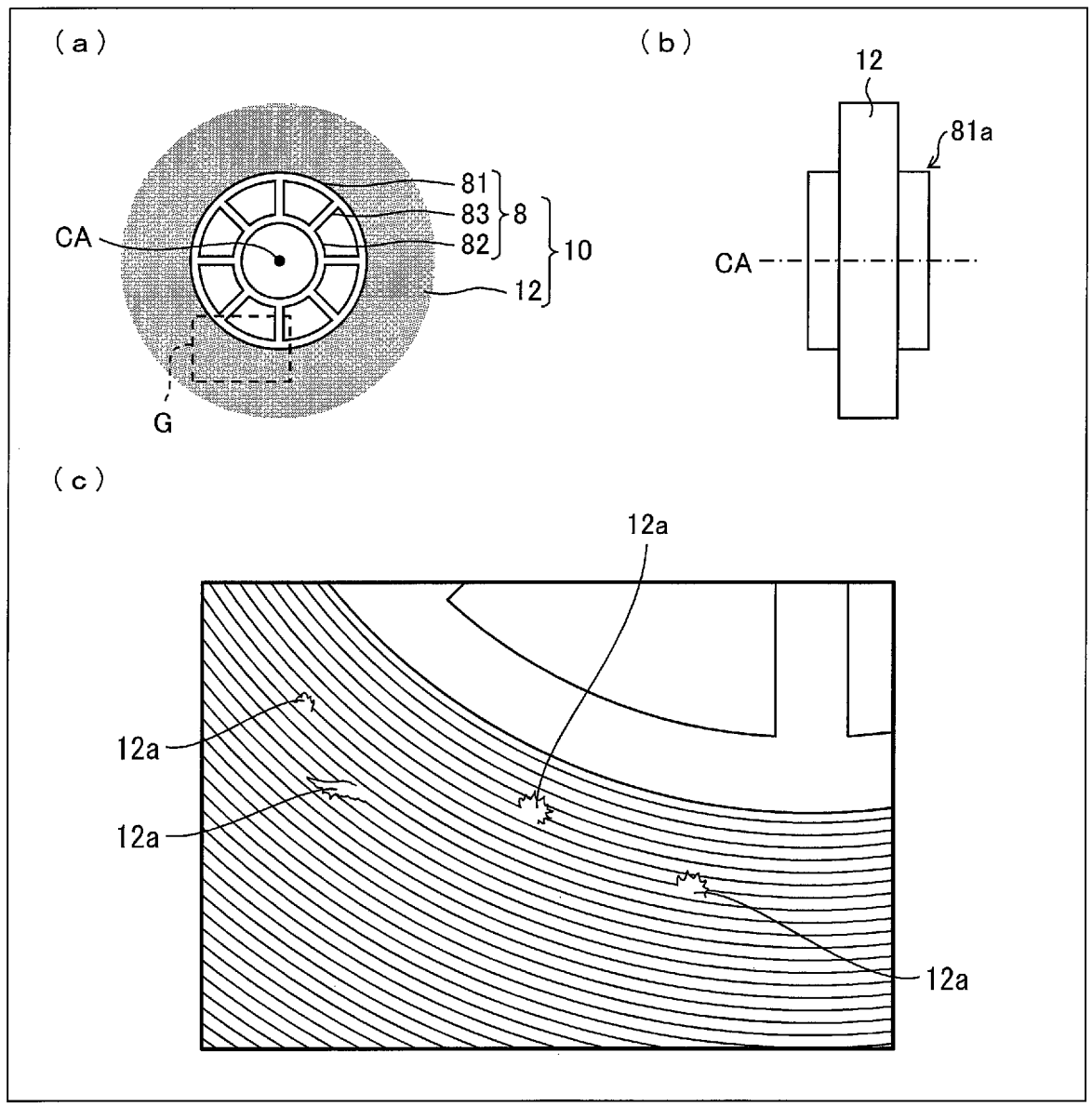
FIG. 15 is a set of views for describing how fuzziness occurs on a separator and a separator roll.

FIG. 15 is a set of views for describing how fuzziness occurs on the separator 12 and the separator roll 10. (a) of FIG. 15 is a front view of the separator roll 10. (b) of FIG. 15 is a side view of the separator roll 10. (c) of FIG. 15 is an enlarged view of an area G shown in (a) of FIG. 15. In the following description, a separator 12 is a slit separator.

As illustrated in (a) and (b) of FIG. 15, the separator roll 10 includes a core 8 having an outer circumferential surface 81a on which the separator 12 is wound. The core 8 includes an outer cylinder part 81, an inner cylinder part 82, and ribs 83. The core 8 is identical in function to the above-described cores u and l.

The above-described "fuzz" occurs on side parts, which are slit parts, of the separator 12. As illustrated in (c) of FIG. 15, in a case where the separator 12 is wounded on the core 8, fuzzes 12a appear on an end surface of the side parts of the separator roll 10.

(Advantages of Small Amount of Fuzziness)

If the fuzzes 12a are scattered when, for example, the separator 12 is wound off from the separator roll 10, then there is a risk of adversely affecting a battery to be produced by use of the separator 12. In addition, appearances of the separator roll 10 and of the separator 12 are impaired as illustrated in (c) of FIG. 15. The separator 12 is also linearly slit in an MD direction. In this case, there is a risk that tears occur from the fuzzes 12a when tensile force is applied to the separator 12. Furthermore, in a case where the fuzzes 12a are mixed in during battery production, separators 12 overlap each other at parts where the fuzzes 12a are mixed in, and therefore the parts end up having higher resistance than do other parts therearound. This causes local variations in electric current density. Therefore, the fuzzes 12a may cause (i) cathode degradation of a battery and (ii) generation of dendrite. With the configuration of Embodiment 1, it is possible to suppress the occurrence of such fuzzes 12a.

[Embodiment 2]

The following discusses Embodiment 2 of the present invention with reference to FIGS. 10 to 13. Note that, for convenience, members identical in function to the members in the above-described embodiment are given the same reference signs, and their descriptions will be omitted (the same is true of the subsequent embodiments).

<<Other Separator Slitting Methods and their Effects>>

(Circular Slitting Blade)

Figure 10:
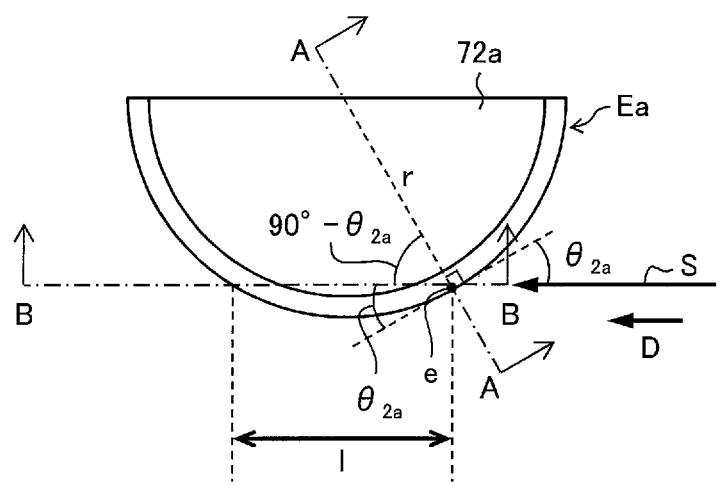
FIG. 10 is a front view illustrating a configuration of a slitting blade for use in a separator slitting method in accordance with Embodiment 2.

FIG. 10 is a front view illustrating a configuration of a slitting blade 72a for use in a separator slitting method in accordance with Embodiment 2.

As illustrated in FIG. 10, the slitting blade 72a includes a blade edge Ea which, is a circular blade having a shape of a circular arc (arc-shaped). A radius r is a radius of the circular arc. A length l is (i) a length of a part of the slitting blade 72a, which part falls on a plane including the original sheet S and (ii) a length measured in a direction D. In this case, an entry angle $\theta_{2a}$, which is an angle between (i) a circular-arc-shaped tangent (tangent plane) at a point e from which the slitting blade 72a slits the original sheet S and (ii) the original sheet S, can be represented by the following Formula (7):

$$\cos(90° - \theta_{2a}) = (l/2)/r \quad \text{Formula (7)}$$

The above Formula (7) can be modified into the following Formula (8):

$$90° - \theta_{2a} = \cos^{-1}((l/2)/r) \quad \text{Formula (8)}$$

The above Formula (8) can be modified into the following Formula (9):

$$\theta_{2a} = 90° - \cos^{-1}((l/2)/r) \quad \text{Formula (9)}$$

(Equivalent Conditions Producing Identical Effect as that of Flat Slitting Blade)

The fact that the entry angle $\theta_{2a}$ is formed between the blade edge Ea of the slitting blade 72a and the original sheet S is equivalent to the fact that the mounting angle $\theta_2$ is formed between the blade edge E of the above-described slitting blade 72 and the original sheet S. In this case, the A-A cross section shown in FIG. 10 corresponds to the A-A cross section shown in (a) and (b) of FIG. 7. The B-B cross section shown in FIG. 10 corresponds to the B-B cross section shown in (a) and (b) of FIG. 8.

(Slitting by Use of Single-Beveled Slitting Blade)

Figure 11:
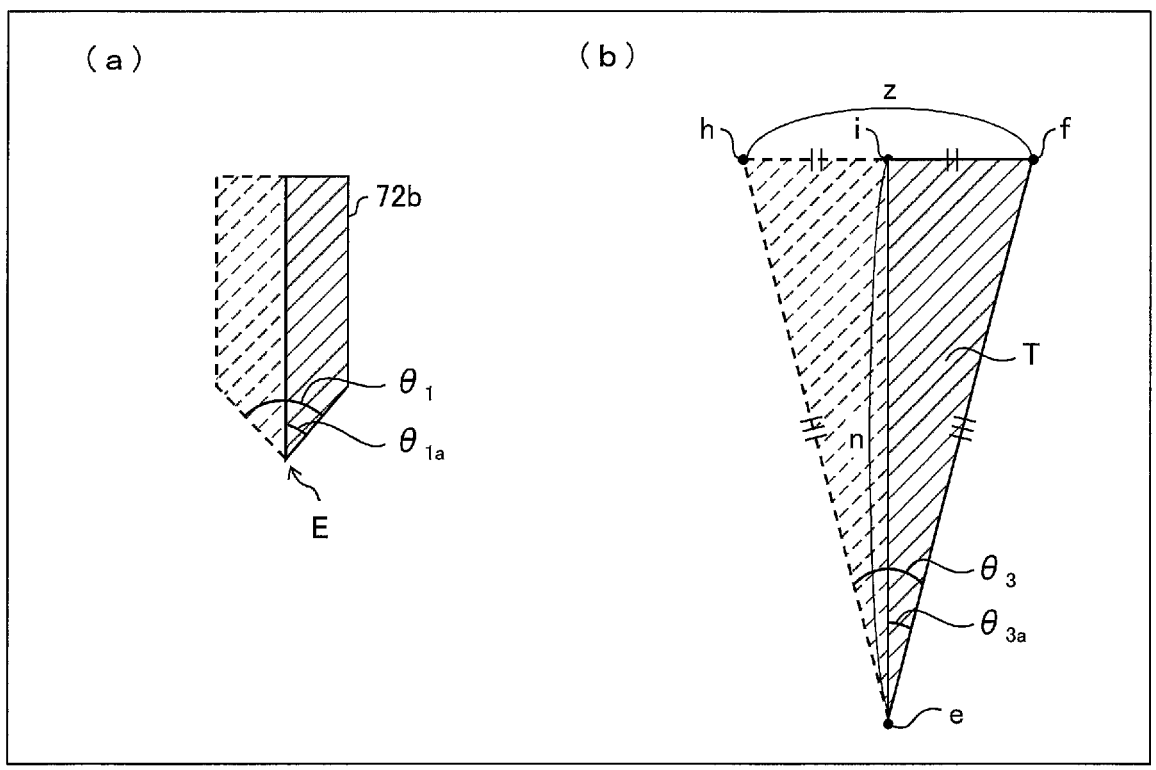
FIG. 11 is a set of cross-sectional views illustrating a configuration of a slitting blade which is different from the slitting blade illustrated in FIG. 10.

FIG. 11 is a set of cross-sectional views illustrating a configuration of a slitting blade 72b which is different from the slitting blade illustrated in FIG. 10. (a) of FIG. 11 is a cross-sectional view corresponding to (b) of FIG. 7. (b) of FIG. 11 is a cross-sectional view corresponding to (d) of FIG. 9.

As illustrated in (a) of FIG. 11, the slitting blade 72b is a single-beveled blade. A cross section of the slitting blade 72b matches the shape of a right half of the cross section of the slitting blades 72 illustrated in (a) of FIG. 7. Note, however, that the cross section of the slitting blade 72b is not limited to such a shape, but can be a shape with right and left sides reversed.

Note that a cross-sectional angle $\theta_{1a}$ of a blade edge E of the slitting blade 72b is a half of the cross-sectional angle $\theta_1$ of the slitting blades 72.

$$\theta_{1a}=\theta_1/2 \quad \text{Formula (10)}$$

In addition, as illustrated in (b) of FIG. 11, a tangent-plane blade edge angle $\theta_{3a}$ of the slitting blade 72b is half of the tangent-plane blade edge angle $\theta_3$ of the slitting blades 72.

$$\theta_{3a}=\theta_3/2 \quad \text{Formula (11)}$$

By substituting the above Formulas (10) and (11) into the above Formula (6), the following Formula (12) can be obtained:

$$\theta_{3a}=\tan^{-1}(\sin(\theta_2)\cdot\tan(\theta_{1a})) \quad \text{Formula (12)}$$

By use of the above Formula (12), the tangent-plane blade edge angle $\theta_{3a}$ of the slitting blade 72b, which is a single-beveled blade, can also be calculated as is the case of the slitting blades 72 which is a double-beveled blade.

(Slitting on Roller)

Figure 12:
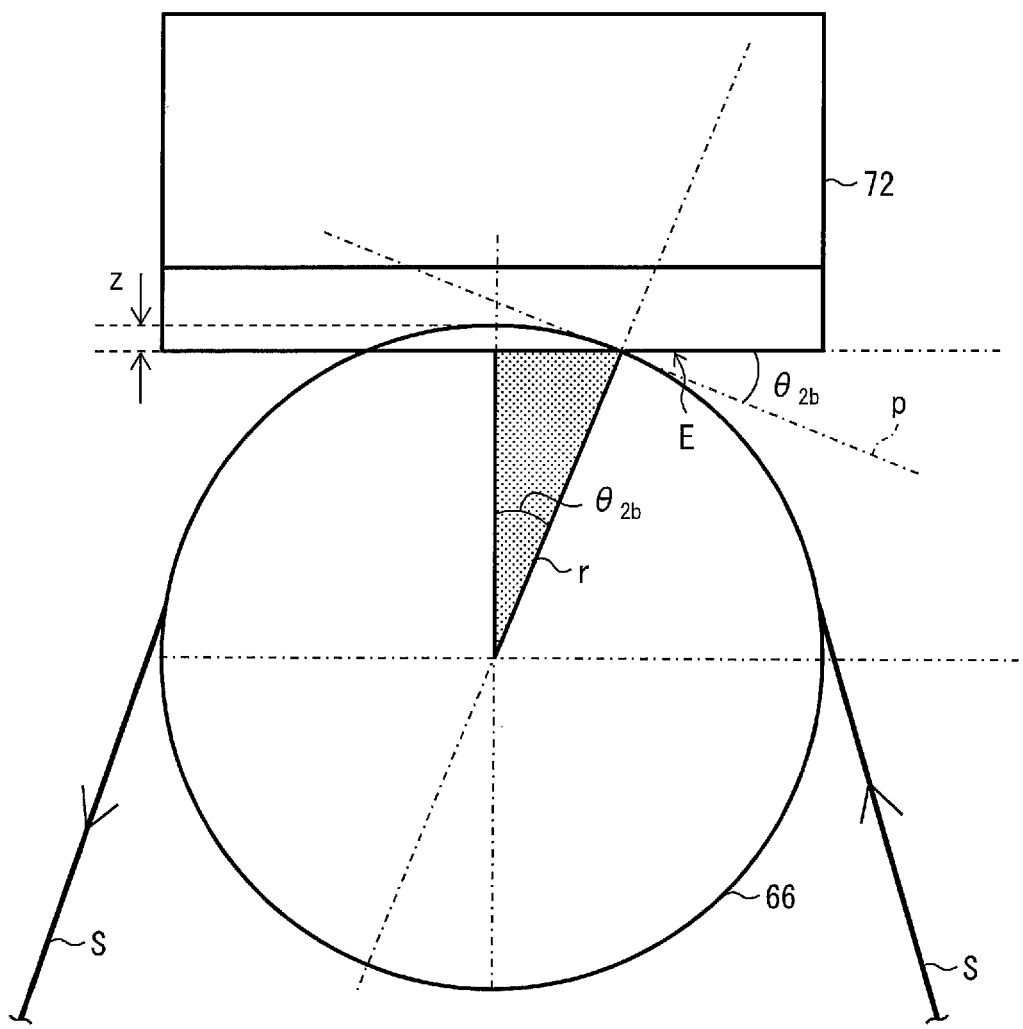
FIG. 12 is a front view illustrating a separator slitting method which is different from the separator slitting method in which the slitting blade illustrated in FIG. 10 is used.

FIG. 12 is a front view illustrating a separator slitting method which is different from the separator slitting method in which the slitting blade 72a illustrated in FIG. 10 is used.

As illustrated in FIG. 12, an original sheet S is conveyed on a roller 66 (conveying section). The roller 66 is provided with grooves in each of which part of a blade edge E of a corresponding slitting blade 72 can be inserted. A blade depth z is a depth of the part of the blade edge E, which part is inserted in the roller 66. A tangent plane p is a tangent plane on which a slitting position of the slitting blade 72 is in contact with the original sheet S.

In this case, an entry angle $\theta_{2b}$ formed between the slitting blade 72 and the original sheet S being conveyed by the roller 66 can be calculated by use of the following Formula (13):

$$\theta_{2b}=\cos^{-1}((r-z)) \quad \text{Formula (13)}$$

r: radius of roller 66

By using this angle $\theta$ in a manner similar to how the mounting angle $\theta_2$ is used, the tangent-plane blade edge angle $\theta_3$ can be calculated according to the above Formula (6).

Alternatively, the above-described slitting blade 72b can be used instead of the slitting blade 72. In such a case also, by using the entry angle in a manner similar to how the mounting angle $\theta_{2b}$ is used, the tangent-plane blade edge angle $\theta_{3a}$ can be calculated according to the above Formula (12).

It is thus possible to calculate a tangent-plane blade edge angle even in a case of slitting an original sheet S on a roller.

(Slitting by Use of a Pair of Slitting Blades)

Figure 13:
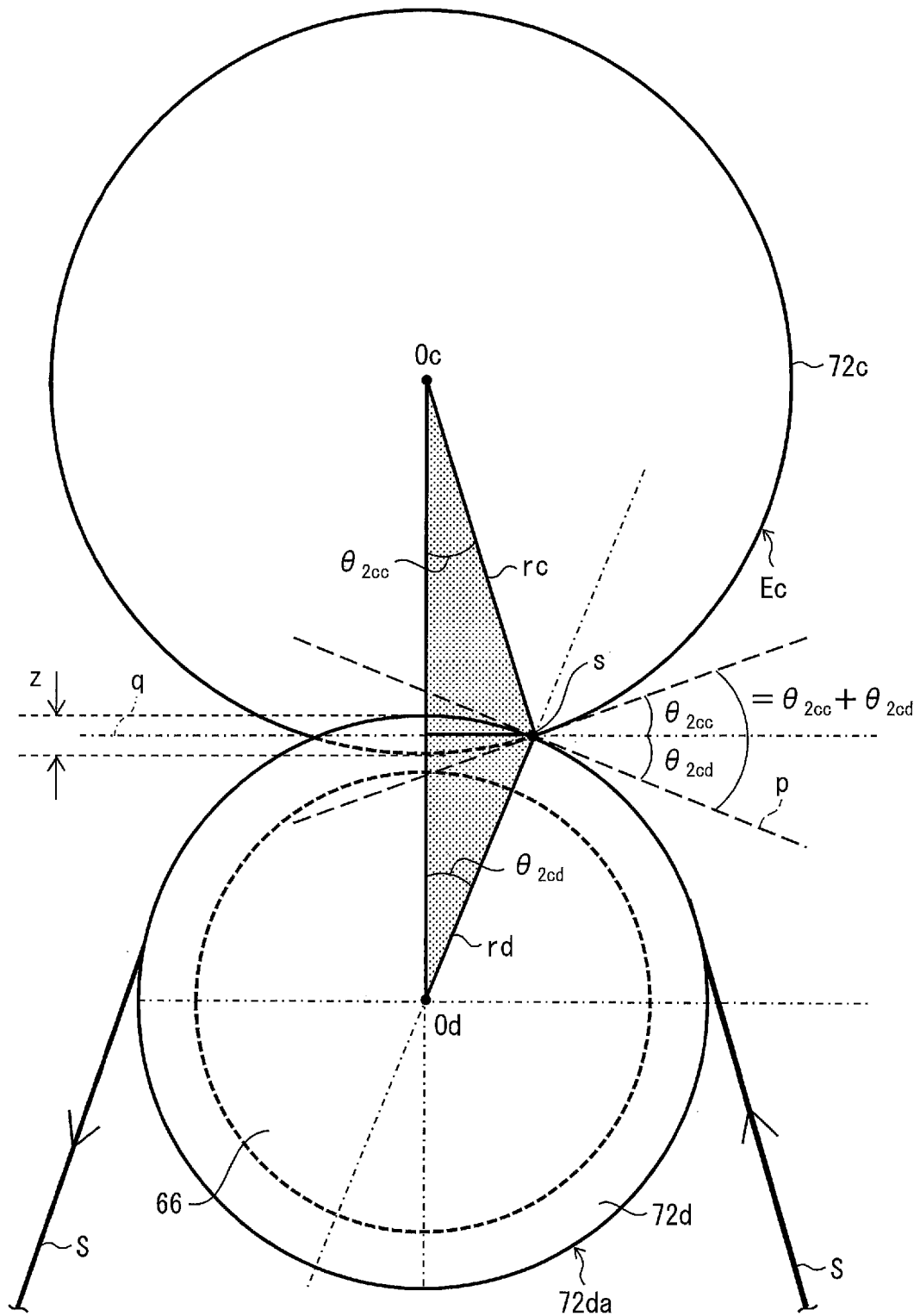
FIG. 13 is a front view illustrating another separator slitting method which is different from the separator slitting method in which the slitting blade illustrated in FIG. 10 is used.

FIG. 13 is a front view illustrating another separator slitting method which is different from the separator slitting method in which the slitting blade 72a illustrated in FIG. 10 is used.

As illustrated in FIG. 13, each of pairs of slitting blades 72c and 72d slits an original sheet S. The slitting blade 72c and the slitting blade 72d can be different from each other in size.

As each of slitting blades 72c, an industrial precision knife "GUBD-09807T45DC15 (cross-sectional angle $\theta_{1a}$ of blade edge; 45°)" manufactured by Kyocera Corporation, for example, can be used. As each of slitting blades 72d, an industrial precision knife "GDBD-08005T" manufactured by Kyocera Corporation, for example, can be used.

Figure 14:
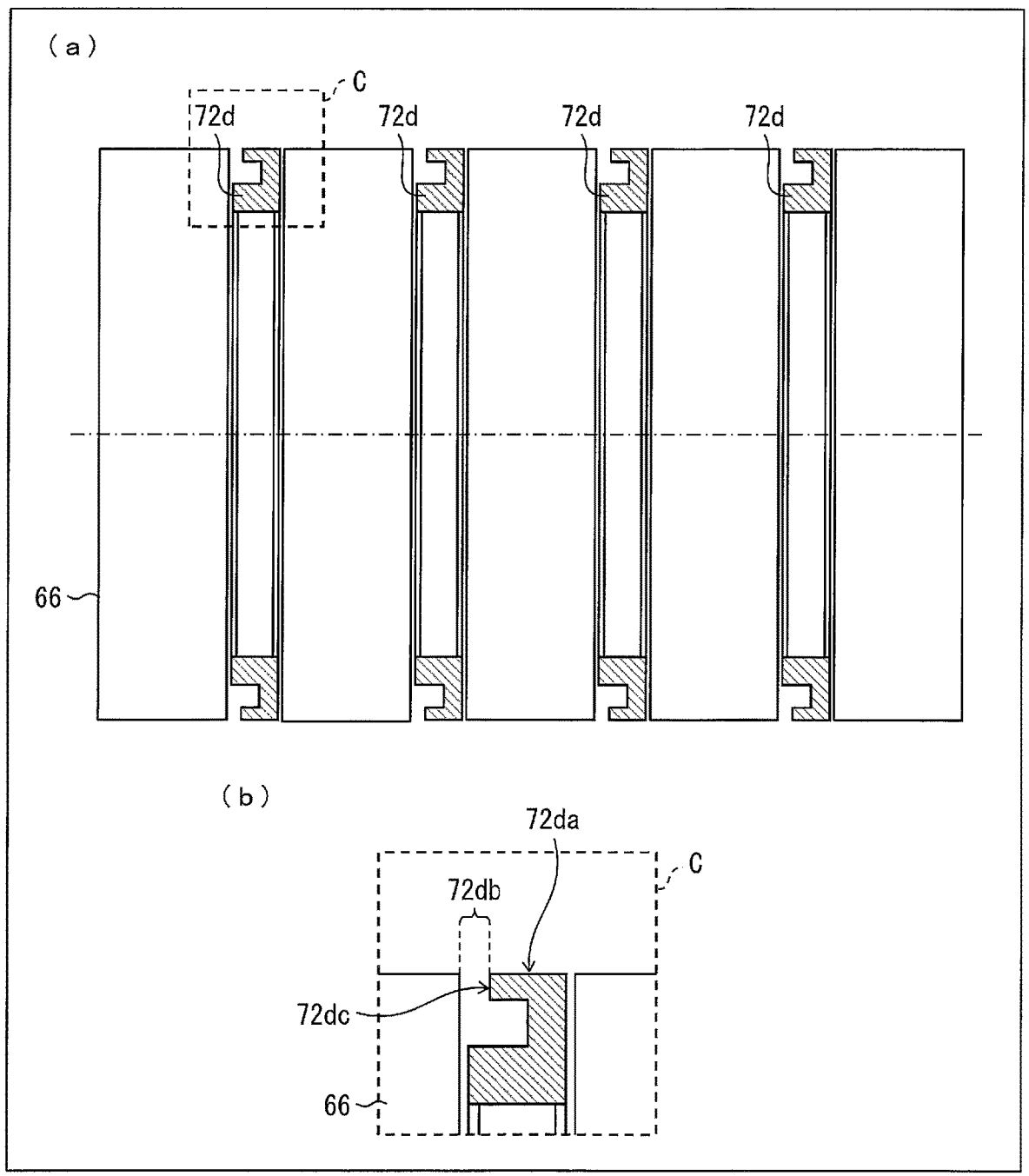
FIG. 14 is a set of cross-sectional views illustrating a configuration, when viewed from a side, of the slitting blades which are lower blades of pairs of slitting blades for use in the separator slitting method illustrated in FIG. 13.

FIG. 14 is a set of cross-sectional views illustrating a configuration, when viewed from a side, of the slitting blades 72d which are lower blades of the pairs of slitting blades 72c and 72d for use in the separator slitting method illustrated in FIG. 13. (a) of FIG. 14 is a view illustrating an overall configuration. (b) of FIG. 14 is a view enlarging an area C shown in (a) of FIG. 14.

As illustrated in (a) and (b) of FIG. 14, the slitting blades 72d are incorporated in the roller 66. An outer diameter of each of the slitting blades 72d is identical to that of the roller 66. Therefore, the original sheet S is conveyed along outer circumferences 72da of the slitting blades 72d which rotate in coordination with the roller 66.

The slitting blades 72d are each provided with a groove part 72db. The slitting blades 72c, which are upper blades of the pairs of slitting blades 72c and 72d, are each a single-beveled blade. A blade edge Ec of each of the slitting blades 72c is in contact with a corresponding one of side parts 72dc, each of which is part of a side surface of a groove part 72db of a slitting blade 72d.

Note that, according to the law of cosines, the following Formulas (14) to (16), which concern a triangle having points Oc, Od and s shown in FIG. 13, can be worked out. Note an auxiliary line q is (i) an auxiliary line for angle calculation and (ii) a straight line that passes two points at which the blade edge Ee of the slitting blade 72c and the outer circumference 72da of the slitting blade 72d intersect.

$$rc^2+OcOd^2-2\cdot rc\cdot OcOd\cdot\cos(\theta_{2ce})=rd^2 \quad \text{Formula (14)}$$

$$rd^2+OcOd^2-2\cdot rd\cdot OcOd\cdot\cos(\theta_{2cd})=rc^2 \quad \text{Formula (15)}$$

$$OcOd=rc+rd-n \quad \text{Formula (16)}$$

rc: Radius of slitting blade 72c rd: Radius of slitting blade 72d

OcOd: Length between (i) the point Oc which is a center around which the slitting blade 72c rotates and (ii) the point Od which is a center around which the slitting blade 72d rotates $\theta_{2cc}$: One entry angle between the auxiliary line q and the blade edge Ec of the slitting blade 72c $\theta_{2cd}$: The other entry angle between the auxiliary line q and the outer circumference 72da of the slitting blade 72d z: Depth by which the slitting blade 72c and the slitting blade 72d are in contact with each other By modifying the above Formulas (14) to (15), the following Formulas (17) to (18) can be obtained:

$$\theta_{2cc}=\cos^{-1}((rc^2+OcOd^2-rd^2)/(2 \cdot rc \cdot OcOd)) \quad \text{Formula (17)}$$

$$\theta_{2cd}=\cos^{-1}((rd^2+OcOd^2-rc^2)/(2 \cdot rc \cdot OcOd)) \quad \text{Formula (18)}$$

By using an entry angle "$\theta_{2cc}+\theta_{2cd}$", which is a sum of said one and the other entry angles $\theta_{2cc} \cdot \theta_{2cd}$, in a manner similar to how the mounting angle $\theta_2$ is used, it is possible to calculate the tangent-plane blade edge angle $\theta_{3a}$ according to the above Formula (12).

It is thus possible to calculate a tangent-plane blade edge angle even in a case of slitting an original sheet S by use of pairs of slitting blades.

[Embodiment 3]

The following describes Embodiment 3 of the present invention.

<<Verification of Separator Slitting Method>>

In the following description, a type of separator to be slit, a type of slitting blade (flat blade, circular blade), a cross-sectional shape (double-beveled blade, single-beveled blade) of a slitting blade, a cross-sectional angle $\theta_1$ of a blade edge of a slitting blade, and a mounting angle $\theta_2$ of the slitting blade are variously changed so as to specifically verify that quality of a slit separator depends on a tangent-plane blade edge angle $\theta_3$.

(Conditions in Which to Produce Slitting Film)

<Production of Polyolefin Porous Film>

In this verification, two types of separators are used. These separators are identical to the above-described "heat resistant separator". Conditions, in which to produce a porous film constituting each of the heat resistant separators, are as follows.

70% by weight of a high molecular weight polyethylene powder (GUR4032 (manufactured by Ticona Corporation)) and 30% by weight of polyethylene wax (FNP-0115 (manufactured by Nippon Seiro Co., Ltd.)) having a weight-average molecular weight of 1000 were prepared. Then, to a total of 100 parts by weight of the high molecular weight polyethylene and the polyethylene wax thus prepared, 0.4 part by weight of antioxidant (Irg1010 (manufactured by Ciba Specialty Chemicals Corporation)), 0.1 part by weight of (P168 (manufactured by Ciba Specialty Chemicals Corporation)), and 1.3 parts by weight of sodium stearate were added. Then, to 100% by volume of a resultant mixture, 38% by volume of calcium carbonate (manufactured by Maruo Calcium Co., Ltd.) having an average par tide size of 0.1 μm was added. A resultant powder, while being a powder, was mixed with the use of a Henschel mixer. Then, the resultant powder was melted and kneaded with the use of a biaxial kneader, so that a polyolefin resin composition was obtained. The polyolefin resin composition was rolled with the use of a parr of rolls each having a surface temperature of 150° C., so that a sheet was produced. The sheet was immersed in a hydrochloric acid aqueous solution (4 mol/L of hydrochloric acid, 0.5% by weight of nonionic surfactant), so that calcium carbonate was removed. Then, a resultant sheet was stretched by a given multiplying factor at 105° C., so that a polyolefin porous film having a thickness of 13.5 μm was obtained.

<Synthesis of Para-Aramid>

Conditions, in which to produce para-aramid for obtaining a heat resistant layer constituting each of the heat resistant separators, are as follows.

Para-aramid (poly (paraphenylene terephthalamide)) was produced with the use of a 3-liter separable flask equipped with a stirring blade, a thermometer, a nitrogen incurrent canal, and a powder addition port. In the flask in a sufficiently dry state, 2200 g of N-methyl-2-pyrrolidone (NMP) was introduced, and then 151.07 g of calcium chloride powder, which had been dried in vacuum at 200° C. for 2 hours, was added. A temperature of the flask was then increased to 100° C., so that calcium chloride was completely dissolved in the NMP. A temperature of a resultant calcium, chloride solution was returned to room temperature, and then 68.23 g of paraphenylene diamine was added to and completely dissolved in the solution. 124.97 g of terephthalic acid dichloride was divided into 10 parts, which were then added at approximately 5-minute intervals to the solution while the solution was maintained at 20° C.±2° C. The solution was matured while being stirred and maintained at 20° C.±2° C. for 1 hour, so that a para-aramid solution having a para-aramid concentration of 6% by weight.

<Production of Heat Resistant Layer-Forming Slurry A>

Conditions, in which, to produce a heat resistant layer-forming slurry A for obtaining the heat resistant layer, are as follows.

To 100 g of the para-aramid solution thus obtained, 243 g of NMP was added, and then a resultant solution was stirred for 60 minutes, so that a para-aramid solution having a para-aramid concentration of 1.75% by weight was obtained. Meanwhile, 6 g of alumina powder (Alumina C (manufactured by Nippon Aerosil Co., Ltd.), absolute specific gravity: 3.2 g/cm$^3$) and 6 g of alumina powder (Advanced Alumina AA-03 (manufactured by Sumitomo Chemical Co., Ltd.), absolute specific gravity: 4.0 g/cm$^3$) were mixed, so that 12 g of an alumina powder mixture was obtained. Then, 12 g of the alumina powder mixture was mixed with the para-aramid solution having a para-aramid concentration of 1.75% by weight, and then a mixture was stirred for 240 minutes, so that an alumina powder-containing para-aramid solution was obtained. Then, the alumina powder-containing para-aramid solution was filtered with the use of a 1000-mesh metal net. Then, to a resultant filtrate, 0.73 g of calcium oxide was added. Then, a resultant mixture was stirred for 240 minutes for neutralization, and was then defoamed under reduced pressure, so that the heat resistant layer-forming slurry A was obtained.

<Production of Laminated Porous Film A>

Conditions, in which to produce one of the above-described two types of separators, are as follows.

A roll (width: 300 mm, length: 300 m) of the polyolefin porous film was attached to a wind-off machine. While the polyolefin porous film was being pulled, the heat resistant layer-forming slurry A was applied to one surface of the polyolefin porous film, so that a laminated porous film A was continuously obtained.

To be specific, NMP was applied to a lower surface of the polyolefin porous film with the use of a micro-gravure coaler, and the heat resistant layer-forming slurry A was applied, in a prescribed thickness, to an upper surface of the polyolefin porous film with the use of a bar coater. Next, the film after being thus coated was allowed to pass through the inside of a constant temperature/humidity chamber (temperature: 50° C., relative humidity: 70%), so that para-aramid was precipitated from the coated film. Then, the film was allowed to pass through a water washing device (device having such a structure that a guide roll is set in a chamber (i) into which ion exchange water is injected at an injection rate of 10 liters/minute and (ii) from which the ion exchange water filling the inside of the chamber is discharged at a rate identical to the injection rate), so that NMP and calcium chloride were removed from the film.

Then, while hot air is blowing at the washed film with the use of a dryer, the film was allowed to pass through a heat roll, so that moisture content was dried and removed. This caused a laminated porous film A, which had a thickness of 17.0 μm and was constituted by laminating a heat resistant layer on one surface of the polyolefin porous film, was obtained.

A plate knife (manufactured by Kyocera Corporation, FBC4019G, blade edge cross-sectional angle: 25°) was attached to a slitting apparatus (manufactured by Hagihara Industries Inc., model: HDF-105S-1000). Then, in accordance with the conditions shown in Table 1, the laminated porous film A was slit while being moved along a roll having a diameter of 80 mm.

<Production of Heat Resistant Layer-Forming Slurry B>

Conditions, in which to produce a heat resistant layer-forming slurry B for obtaining a heat resistant layer to be provided on the other one of the above-described two types of separators, are as follows.

To a medium in which a weight ratio between pure water and isopropyl alcohol was 90:10, carhoxymethyl cellulose (CMC) (1110 (Manufactured by Daicel FineChem Ltd.), absolute specific gravity: 1.6 g/cm$^3$) and alumina powder (AKP3000 (manufactured by Sumitomo Chemical Co., Ltd.), absolute specific gravity: 4.0 g/cm$^3$) were added and mixed at a weight ratio of 3:100 so that a solid content concentration was 28% by weight. Then, a resultant mixture was dispersed under high pressure, so that the resistant layer-forming slurry B was obtained.

<Production of Laminated Porous Film B>

Conditions, in which to produce the other separator, are as follows.

To a non-coated surface of the laminated porous film A, the heat resistant layer-forming slurry B was applied, so that a laminated porous film B was continuously obtained.

To be specific, the non-coated surface of the laminated porous film A was subjected to a corona treatment. Then, the heat resistant layer-forming slurry B was applied, with the use of a gravure coating machine, to the surface which was thus subjected to the corona treatment, and then the surface was dried. This caused a laminated porous film B, which had a thickness of 25.5 μm and was constituted by laminating an aramid heat resistant layer on one surface of the polyolefin porous film and by laminating a heat resistant layer (constituted by an alumina powder) on the other surface of the polyolefin porous film, was obtained.

(Slitting Conditions)

TABLE 1

| Film type | Blade depth z (mm) | Cross-sectional angle θ1 (°) | Mounting angle θ2 (°) | Tangent-plane blade edge angle θ3 (°) | Fuzziness amount |
|---|---|---|---|---|---|
| Ex. 1 | A | 1.0 | 25 | 12.8 | 5.6 | Grade A |
| Ex. 2 | B | 0.5 | 45 | 12.2 | 11.9 | Grade A |
| Ex. 3 | B | 1.0 | 45 | 17.3 | 16.5 | Grade A |
| Ex. 4 | A | 0.5 | 60 | 12.2 | 20.1 | Grade A |
| Ex. 5 | B | 2.0 | 45 | 24.5 | 22.5 | Grade B |
| Ex. 6 | A | 1.0 | 60 | 17.3 | 27.2 | Grade B |
| C.E. 1 | A | 0.2 | 25 | 5.7 | 2.5 | Grade C |
| C.E. 2 | A | 2.0 | 60 | 24.5 | 35.7 | Grade C |

TABLE 1-continued

<Abbreviations>
Ex.: Example
C.E.: Comparative Example

Table 1 shows the verification results indicating that quality of a slit separator (laminated porous film A or B after being slit) depends on a tangent-plane blade edge angle $\Theta_3$.

As shown in Table 1, the verification was performed by use of eight examples (Examples 1 through 6, Comparative Examples 1 and 2). In regard to "Example 1" on the first row of Table 1, numerical values provided in columns to the right of the leftmost column indicate numerical values obtained in Example 1. The same principle also applies to the other examples.

"Film type" indicates whether a slit separator is the above-described laminated porous film A or B.

"Blade depth z", "Cross-sectional angle $\theta_1$", "Mounting angle $\theta_2$", and "Tangent-plane blade edge angle $\theta_3$" are as described in the above embodiments.

"Fuzziness amount" indicates an amount of fuzziness that occurred at slit parts of a slit separator. "Grade A" indicates that the -quality of a slit separator is excellent (there is no visible fuzziness). "Grade B" indicates that there is a small amount of fuzziness on a slit separator. "Grade C" indicates that there is a large amount of fuzziness on a slit separator (there are more than one occurrences of visible fuzziness).

<Example 1 and Comparative Example 1>

These are examples in each of which (i) a plate knife (manufactured by Kyocera Corporation, FBC4019G, blade edge cross-sectional angle: 25°) was attached to a slitting apparatus (manufactured by Hagihara Industries Inc., model: HDF-105S-1000) and then (ii) in accordance with the conditions shown in Table 1, the laminated porous film A was slit while being moved along a roll having a diameter of 80 mm.

<Examples 2, 3 and 5>

These are examples in each of which (i) gable blades (manufactured by Kyocera Corporation, upper blade: GUBD-09807T45DC15 (blade edge cross-sectional angle: 45°) and a lower blade: GDBD-08005T) were attached to a slitting apparatus (manufactured by Hagihara Industries Inc., model: HDF-924-1900) and then (ii) in accordance with the conditions shown in Table 1, the laminated porous film B was slit while being moved along the lower blade.

<Examples 4 and 6 and Comparative Example 2>

These are examples in each of which (i) gable blades (manufactured by Kyocera Corporation, upper blade: GUBD-09807T60DC15 (blade edge cross-sectional angle: 60°), lower blade: GDBD-08005T) were attached to a slitting apparatus (manufactured by Hagihara Industries Inc., model: HDP-924-1900) and then (ii) in accordance with the conditions shown in Table 1, the laminated porous film A was slit while being moved along the lower blade.

(Other Slitting Conditions)

Note that an upper blade of gable blades is a single-beveled blade. Therefore, in Examples 2 to 6 and Comparative Example 2 in each of which such gable blades are used, the tangent-plane blade edge angle $\theta_3$ is $\theta_{3a}$ which is a value obtained by substituting the cross-sectional angle $\theta_1$ into $\theta_{1a}$ of the above Formula (12).

Note also that a conveyance speed of a separator at a part at which the separator is slit is not less than 50 m/min and not more than 100 m/min. Note also that a take-up tensile force of the separator is not less than 30 N/m and not more than 90 N/m.

<<Verification Results of Separator Slitting Method>>

The tangent-plane blade edge angle $\theta_3$ is preferably not less than 3° and not more than 35°, more preferably not less than 3° and not more than 21°, and even more preferably not less than 5° and not more than 21°.

Specifically, the fuzziness amounts in Examples 1 through 6 are each at the grade A or B. Meanwhile, the fuzziness amounts in Comparative Examples 1 and 2 are each at the grade C. This means that in a case where the tangent-plane blade edge angle $\theta_3$ is in a range of not less than 3° to not more than 35°, it is possible to obtain a good-quality slit separator having a small amount of fuzziness at a slit part thereof In particular, the fuzziness amounts in Examples 1 to 4 are each at the grade A. This means that in a case where the tangent-plane blade edge angle $\theta_3$ is in a range of not less than 5° to not more than 21°, it is possible to obtain a good-quality slit separator having a smaller amount of fuzziness at a slit part thereof.

The quality of a slit separator thus depends on a tangent-plane blade edge angle $\theta_3$. In other words, it can be said that as long as the tangent-plane blade edge angle $\theta_3$ remains at the identical value, it is possible to obtain a slit separator of the identical quality even if any of the following changes: a type of a separator to be slit; a type of a slitting blade (flat blade, circular blade); a cross-sectional shape (double-beveled blade, single-beveled blade) of a slitting blade, a cross-sectional angle $\theta_1$ of a blade edge of the slitting blade; and a mounting angle $\theta_2$ of the slitting blade.

[Embodiment 4]

The following description will discuss Embodiment 4 of the present invention.

<<Configurations for Maintaining Consistent Tangent-Plane Blade Edge Angles Among a Plurality of Slitting Blades>>

Figure 16:
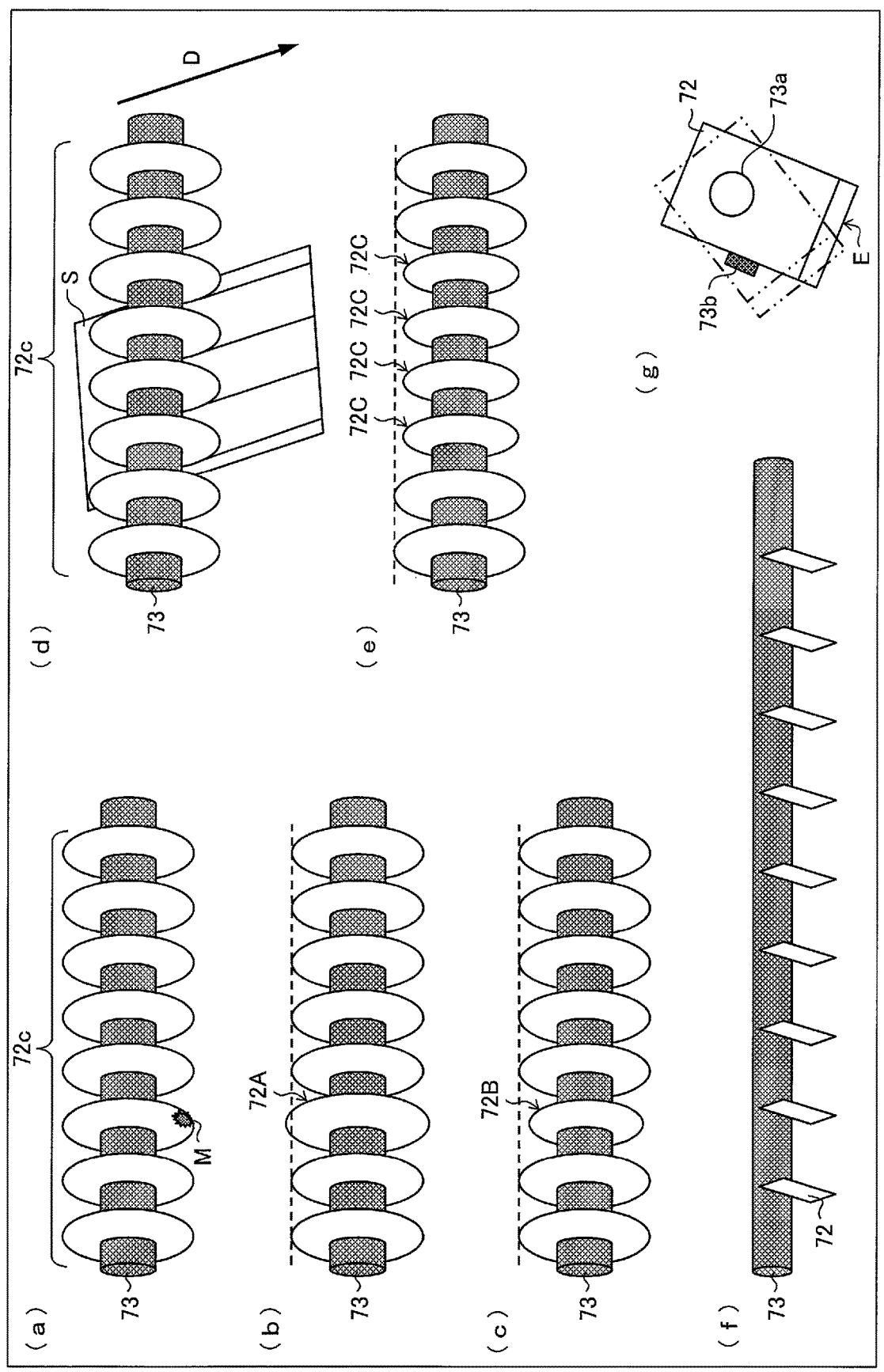
FIG. 16 is a set of schematic views each illustrating a configuration for maintaining consistent tangent-plane blade edge angles among a plurality of slitting blades in Embodiment 4.

FIG. 16 is a set of schematic views each illustrating a configuration for maintaining consistent tangent-plane blade edge angles $\theta_3$ among a plurality of slitting blades in accordance with Embodiment 4. (a) to (e) of FIG. 16 each illustrate a configuration in which circular slitting blades 72c are used. (f) and (g) of FIG. 16 each illustrate a configuration in which flat slitting blades 72 are used.

As illustrated in (a) of FIG. 16, in a case of circular slitting blades 72c, it is possible to maintain consistent tangent-plane blade edge angles $\theta_3$ among the circular slitting blades 72c by attaching, to a single axis 73, a plurality of slitting blades 72c.

Note that as slitting continues, slitting blades 72c are each increasingly abraded. In addition, a defect M such as chipping occurs to a slitting blade (s) 72c in some cases. As illustrated in (b) of FIG. 16, if only a slitting blade 72c suffering a defect is replaced with another one, then there is an imbalance in size between (i) a slitting blade 72A which is said another one and (ii) the other slitting blades 72c which have been abraded due to slitting. In this case, there is also an imbalance in tangent-plane blade edge angle $\theta_3$ between the slitting blade 72A and the slitting blades 72c. Furthermore, as illustrated in (c) of FIG. 16, even in a case where a slitting blade 72c suffering the defect is ground so as to be restored, there is an imbalance in tangent-plane blade edge angle $\theta_3$ between (i) a slitting blade 72B which is the ground slitting blade 72c and (ii) the other slitting blades 72c which have not been ground.

As illustrated in (d) of FIG. 16, an original sheet S, which is conveyed in a direction D and which has a prescribed width, is slit by slitting blades 72c, the number of which slitting blades 72c corresponds to the prescribed width. As illustrated in (e) of FIG. 16, of all slitting blades 72c, only slitting blades 72C whose blades touch the original sheet S become abraded due to the slitting. Therefore, the number of slitting blades 72c is preferably an appropriate number which corresponds to the width of the original sheet S to be slit, so that the slitting blades 72c are consistent with each other in terms of (i) the extent of abrasion and (ii) the frequency of defect occurrences. In addition, slitting blades 72c for slitting an original sheet S are preferably replaced all at once.

As illustrated in (f) of FIG. 16, even in a ease of flat slitting blades 72, it is also possible to maintain consistent tangent-plane blade edge angles $\theta_3$ among the flat slitting blades 72 by attaching a plurality of slitting blades 72 to a single axis 73 and (ii) moving the plurality of slitting blades 72 all at once. As illustrated in (g) of FIG. 16, slitting blades 72 are attached to a rotation axis 73a preferably by a screw or the like so that the slitting blades 72 are rotatable. In so doing, it is more preferable to provide a stopper 73b so as to specify a rotation range of the slitting blades 72 so that the slitting blades 72 each do not rotate up to, for example, a position indicated by two-dot chain lines.

(Change in Tangent-Plane Blade Edge Angle)

Figure 17:
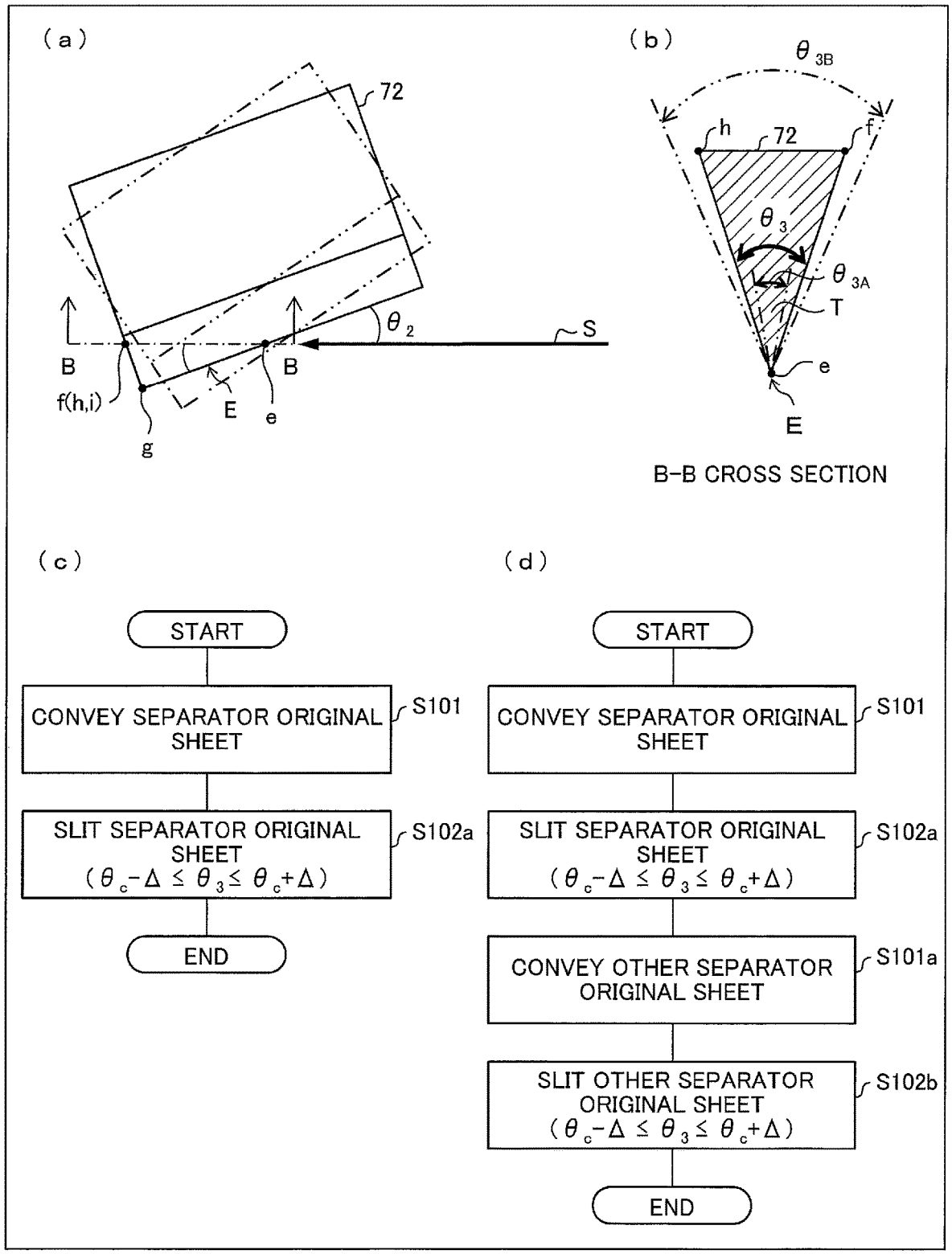
FIG. 17 is a schematic view describing a configuration for making tangent-plane blade edge angles of slitting blades substantially identical with each other.

FIG. 17 is a schematic view describing a configuration for making tangent-plane blade edge angles $\theta_3$ of slitting blades substantially identical with each other. (a) of FIG. 17 illustrates an example in which a position and/or angle of the slitting blade 72 which is a flat blade is changed. (b) of FIG. 17 illustrates an example in which the tangent-plane blade edge angle $\theta_3$ of the slitting blade 72 is changed. (c) of FIG. 17 illustrates a method for producing a slit separator by slitting the original sheet S in such a manner as to make the tangent-plane blade edge angles $\theta_3$ of a plurality of various slitting blades substantially identical with each other, and (d) of FIG. 17 illustrates a method for producing a slit separator by further slitting another original sheet S.

As illustrated by two-dot chain lines in (a) of FIG. 17, when the position and/or angle of the slitting blade 72 is changed, the mounting angle $\theta_2$ is also changed. Consequently, as illustrated in (b) of FIG. 17, the tangent-plane blade edge angle $\theta_3$ of the slitting blade 72 gets smaller to be a tangent-plane blade edge angle $\theta_{3A}$ or gets larger to be a tangent-plane blade edge angle $\theta_{3B}$.

In this case, by calculating the tangent-plane blade edge angle $\theta_3$ by substituting the cross-sectional angle $\theta_1$ of a blade edge E of the slitting blade 72 and the mounting angle $\theta_2$ after the change into the Formula (6), it is possible to calculate the tangent-plane blade edge angles $\theta_{3A}$ and $\theta_{3B}$.

Furthermore, as illustrated in (a) of FIG. 16, the cross-sectional angle $\theta_1$ is changed due to abrasion of the slitting blade 72 and a defect found in the slitting blade 72. As can be seen from the Formula (6), when the cross-sectional angle $\theta_1$ is changed, the tangent-plane blade edge angle $\theta_3$ is changed even if the mounting angle $\theta_2$ is not changed.

Respective tangent-plane blade edge angles of the slitting blade 72a which is a circular blade, the slitting blade 72b which is a single-beveled slitting blade, and the pair of slitting blades 72c and 72d are changed similarly with the tangent-plane blade edge angle $\theta_3$ of the slitting blade 72. Various types of the slitting blades above will be hereinafter referred to as merely "slitting blade".

(Method for Producing Slit Separator Whose Change in Tangent-Plane Blade Edge Angle is Prevented)

As illustrated in (c) of FIG. 17, the method for producing a slit separator in accordance with Embodiment 4 includes the step S101 (first conveying step) of conveying the original sheet S and the step S102a (first slitting step) of slitting the original sheet S with use of a plurality of slitting blades.

In this configuration, in the step S102a, the tangent-plane blade edge angles $\theta_3$ of a plurality of slitting blades are within the range of the angle $\theta_c \pm \Delta$.

The plurality of slitting blades indicate, for example, a plurality of slitting blades 72 illustrated in (b) of FIG. 6 or (f) of FIG. 16 or a plurality of slitting blades 72c illustrated in (a) of FIG. 16.

The angle $\theta_c$ is a target value of the tangent-plane blade edge angles $\theta_3$ of the plurality of slitting blades as above, and is within, for example, the above range α.

Δ is a positive number and is a value indicating a range within which the tangent-plane blade edge angle $\theta_3$ is changed from the angle $\theta_c$. In a case where Δ is so small that the angle $(\theta_c - \Delta)$ and the angle $(\theta_c + \Delta)$ are each within a predetermined range (e.g. the aforementioned range α), tangent plane blade edge angles $\theta_3$ of a plurality of slitting blades can be treated as being a substantially identical angle $\theta_c$.

In the step S102a, tangent-plane blade edge angles $\theta_3$ of a plurality of slitting blades may be within a range of not less than the angle $(\theta_c - \Delta_A)$ and not more than the angle $(\theta_c + \Delta_B)$. In this case, $\Delta_A$ and $\Delta_B$ are 0 of a positive number and are different from each other. In a case where $\Delta_A$ and $\Delta_B$ are so small that the angle $(\theta_c - \Delta_A)$ and the angle $(\theta_c + \Delta_B)$ are each within a predetermined range (e.g. aforementioned range α), tangent-plane blade edge angles $\theta_3$ of a plurality of slitting blades can be treated as being a substantially identical angle $\theta_c$.

(Target Value and Variable Range of Tangent-Plane Blade Edge Angle)

As described above, tangent-plane blade edge angles $\theta_3$ of a plurality of slitting blades being substantially identical with each other is equal to presence of the angle $\theta_c$ and Δ which allow the angle $(\theta_c - \Delta)$ and the angle $(\theta_c + \Delta)$ to be each within a predetermined range.

The predetermined range herein is such a range that when the tangent-plane blade edge angles $\theta_3$ are within that range, a good-quality slit separator having a small amount of fuzziness at a slit part thereof can be obtained. For example, the range of not less than 11.9° and not more than 20.1° which is a range of the tangent-plane blade edge angle $\theta_3$ shown in Examples 2-4 of Table 1 can be considered as the predetermined range.

For example, the angle $\theta_c$ is set to 16.0° which is an average of 11.9° and 20.1°. Furthermore, Δ is set to 4.1° which is a difference between 20.1° and 16.0°. In this case, the angle $(\theta_c - \Delta)$ is 11.9°. The angle $(\theta_c + \Delta)$ is 20.1°. Accordingly, the angle $\theta_c$ and Δ which allow the angle $(\theta_c - \Delta)$ and the angle $(\theta_c + \Delta)$ to be each within a predetermined range are present.

(Step of Slitting Original Sheet with Use of a Plurality of Slitting Blades)

The step S102a which is a step of slitting the original sheet S with use of a plurality of slitting blades is specifically a step of slitting the original sheet S by causing the plurality of slitting blades to cut into the original sheet S such that the tangent-plane blade edge angles $\theta_3$ are substantially identical with each other.

In other words, the step S102a is a step of slitting the original sheet S by causing a plurality of slitting blades to cut into the original sheet S such that the tangent-plane blade edge angles $\theta_3$ are each within a predetermined range.

The predetermined range may be such a range that, for example, when the tangent-plane blade edge angles $\theta_3$ are within that range, a good-quality slit separator having a small amount of fuzziness at a slit part thereof can be obtained.

Causing a plurality of slitting blades to cut into the original sheet S such that the tangent-plane blade edge angles $\theta_3$ are each within a predetermined range indicates causing a plurality of slitting blades, each of which has a cross sectional angle $\theta_1$ within a range that meets the relation of the aforementioned Formula (5) (e.g. not less than 45° and not more than 60°) and has a mounting angle $\theta_2$ within a range that meets the relation of the Formula (5) (e.g. not less than 12.2° and not more than 17.3°) to cut into the original sheet S, with the tangent-plane blade edge angles $\theta_3$ each being within a predetermined range (e.g. not less than 11.9° and not more than 20.1°).

(Method for Producing Slit Separator, Which Maintains Consistent Abrasion State of Slitting Blade)

As illustrated in (d) of FIG. 17, the method for producing a slit separator in accordance with the present embodiment may further include: a step S101a (second conveying step) which is a step of conveying a porous original sheet which is other than the original sheet S conveyed in the aforementioned step S101 and which has the same width as that of the original sheet S conveyed in the step S101; and a step of S102b (second slitting step) which is a step of slitting the other original sheet by causing a plurality of slitting blades to cut into the other original sheet.

In the step S102a, as illustrated in (d) of FIG. 16, the original sheet S is slit with use of a part of the plurality of slitting blades.

In the step S102b, the original sheet conveyed in the step S101a is slit with use of slitting blades identical with those having slit the original sheet S in the step S102a. That is, in order that a plurality of slitting blades have constant degree of abrasion or constant frequency of defects, the number of slitting blades used is an appropriate number corresponding to the width of the original sheet S to be slit in the step S102a and the width of the other original sheet to be slit in the step S102b.

In this case, the tangent-plane blade edge angles $\theta_3$ of the slitting blades used for slitting are each within a range of the angle $\theta_c \pm \Delta$.

<<Effects of the Present Embodiment>>

As illustrated in FIG. 16, by fixing slitting blades, it is possible to prevent positions and angles of slitting blades with respect to an original sheet S from being accidentally changed during an operation of a slitting apparatus 6 (see FIG. 4). This configuration is advantageous particularly in a case where a separator original sheet including an inorganic filler(s) is to be slit, because slitting blades of such a separator original sheet are quickly abraded.

In the method for producing a slit separator illustrated in (c) of FIG. 17, in a case where the original sheet S which is porous is slit, fuzziness can easily occur at a slit part(s) because of porousness of the original sheet S.

In this case, the tangent-plane blade edge angles $\theta_3$ affect fuzziness that occurs at the slit part of the slit separator. The fuzziness can be effectively suppressed by causing the tangent-plane blade edge angles $\theta_3$ to be substantially identical with each other ($\theta_c - \Delta \leq \theta_3 \leq \theta_c + \Delta$).

With the method for producing a slit separator, it is possible to obtain, all at once, a plurality of good-quality slit separators with a small amount of fuzziness at slit parts thereof.

The Δ is preferably not more than 5°, more preferably not more than 3°, and further more preferably not more than 1°.

In this case, since slit parts of the plurality of slit separators have substantially identical fuzziness, quality of the plurality of slit separators is stable. As Δ is smaller, the slit parts of the plurality of slit separators have further identical fuzziness, so that the quality of the plurality of slit separators is more stable.

With the method for producing a slit separator as illustrated in (d) of FIG. 17, it is possible to use the same slitting blades both for a plurality of slitting blades to slit the original sheet S in the step S102*a* and for a plurality of slitting blades to slit other original sheet in the step S102*b*. This allows the slitting blades to be consistent with each other in terms of the extent of abrasion or the frequency of defect occurrences.

As illustrated in (b) of FIG. 6, a slit separator s1 (slit film) is obtained by slitting an original sheet with use of adjacent two slitting blades out of a plurality of slitting blades. Consequently, it is possible to obtain a better-quality slit separator with a small amount of fuzziness at a slit part thereof at both ends of the slit separator s1 in a width direction.

SUMMARY

A method for producing a slit separator in accordance with Aspect 1 of the present invention includes: a conveying step of conveying a battery separator original sheet which is porous; and a first slitting step of slitting the battery separator original sheet by causing a plurality of slitting blades to cut into the battery separator original sheet such that a plurality of slitting blade edge angles in a tangent plane, on which a slitting position is in contact with the battery separator original sheet, are substantially identical with each other.

In a case where a battery separator original sheet which is porous is slit, fuzziness can easily occur at a slit part(s) because of porousness of the battery separator original sheet.

In this case, a slitting blade edge angle (hereinafter, referred to as "tangent-plane blade edge angle") in a tangent plane, on which a slitting position is in contact with a battery separator original sheet, affects fuzziness that occurs at the slit part of the separator. By causing the tangent-plane edge angles to be substantially identical with each other, it is possible to effectively prevent fuzziness.

With the method, it is possible to obtain, all at once, a plurality of good-quality slit separators with a small amount of fuzziness at a slit part thereof.

It is preferable to arrange the method such that in the first slitting step, a film obtained by slitting the battery separator original sheet is obtained by slitting with use of adjacent two slitting blades out of the plurality of slitting blades.

With the method, it is possible to obtain a better-quality slit separator with a small amount of fuzziness at a slitting part, thereof at both ends of the slit, film in a width direction.

It is preferable to arrange the method such that the plurality of slitting blades are attached to a single axis positioned fixedly with respect to the battery separator original sheet.

With the method, the plurality of slitting blades are positioned fixedly with respect to the battery separator original sheet via the single axis. Consequently, it is possible to surely cause the plurality of slitting blades to cut into the battery separator original sheet such that tangent-plane blade edge angles of the plurality of slitting blades are substantially identical with each other.

It is preferable to arrange the method such that at least one of the plurality of slitting blades is a flat blade and is rotatably attached to the axis.

With the method, it is possible to cause the flat blade rotatably attached to the axis to rotate and adjust the angle of the flat blade. This allows fine adjustment such that tangent-plane blade edge angles of slitting blades are substantially identical with each other.

It is preferable to arrange the method such that a rotational angle of said at least one slitting blade rotatably attached to the axis is limited by a stopper positioned fixedly with respect to the axis.

With the method, it is possible to stop the slitting blade rotatably attached to the axis and limit the angle of the slitting blade. This surely allows adjustment such that tangent-plane blade edge angles of the slitting blades are substantially identical with each other.

It is preferable to arrange the method such that in the first slitting step, two or more slitting blades being a part of the plurality of slitting blades slit the battery separator original sheet, and the method further comprises: a second conveying step of conveying other battery separator original sheet which is porous and has a same width as that of the battery separator original sheet; and a second slitting step of slitting the battery separator original sheet by causing said two or more slitting blades to cut into the other battery separator original sheet such that slitting blade edge angles of said two or more slitting blades in a tangent plane, on which a slitting position is in contact with the other battery separator original sheet, are substantially identical with each other.

With the method, it is possible to use the same slitting blades both for a plurality of slitting blades to slit the battery separator original sheet in the first slitting step and for a plurality of slitting blades to slit other battery separator original sheet in the second slitting step. This allows the slitting blades to be consistent with each other in terms of the extent of abrasion or the frequency of defect occurrences.

It is preferable to arrange the method so as to further include the step of replacing the plurality of slitting blades all at once.

With the method, ii is possible to replace, all at once, slitting blades which are abraded to the same extent or to which defect is likely to occur to the same extent.

The method may be arranged such that the battery separator original sheet contains inorganic filler.

In a case where a battery separator original sheet containing inorganic filler is slit, slitting blades are abraded with a faster pace. However, with the method, even in the case where such a battery separator original sheet is slit, it is possible to obtain, all at once, a plurality of good-quality slit separators with a small amount of fuzziness at slit parts thereof.

Furthermore, by fixing a slitting blade with use of the aforementioned stopper, it is possible to prevent erroneously change the position or angle of the slitting blade with respect to the battery separator original sheet. This method is useful particularly in the case where the battery separator original sheet containing inorganic filler is slit because in such a case a slitting blade is abraded with a faster pace.

It is preferable to arrange the method such that in the first slitting step, the battery separator original sheet is slit by causing the plurality of slitting blades to cut into the battery separator original sheet such that the plurality of slitting blade edge angles are each within a predetermined range.

It is preferable to arrange the method such that in the first slitting step, the battery separator original sheet is slit fay causing the plurality of slitting blades, each of which has a cross sectional angle $\theta_1$ within a range that meets Formula (5) below and has a mounting angle $\theta_2$ within a range that meets Formula (5) below, to cut into the battery separator original sheet, with the plurality of slitting blade edge angles being $\theta_3$ within a predetermined range.

$$\tan(\theta_3/2) = \sin(\theta_2) \cdot \tan(\sigma_1/2) \quad \text{Formula (5)}$$

It is preferable to arrange the method such that the predetermined range of the plurality of slitting blade edge angles is a range that enables the method to produce a good-quality slit separator with a small amount of fuzziness at a slit part thereof.

A method for producing a separator roll in accordance with Aspect 2 of the present invention includes: each of the steps recited in the aforementioned method for producing a slit separator; and a winding step of winding, around a core, a separator obtained by slitting the battery separator original sheet.

When a slit separator obtained by slitting a battery separator original sheet is wound around a core, fuzz occurring on side parts of the slit separator in a width direction appears on an end surface of the side parts of a separator roll.

With the method, it is possible to obtain, all at once, a plurality of good-quality separator rolls with a small amount of fuzziness on an end surface of the side parts of each of the separator rolls.

[Referential Example]

A method for producing a slit separator in accordance with Referential Aspect 1 of the present invention includes: a conveying step of conveying a battery separator original sheet which is porous; and a slitting step of slitting the battery separator original sheet by causing a slitting blade to cut into the battery separator original sheet such that a slitting blade edge angle in a tangent plane, on which a slitting position is in contact with the battery separator original sheet, is in a range of not less than 3° to not more than 35°.

The battery separator original sheet which is porous has a tendency that, due to its porosity, a slit part thereof is likely to have fuzziness when the battery separator original sheet is slit.

The inventors found that (i) a slitting blade edge angle (hereinafter, referred to as "tangent-plane blade edge angle") in a tangent plane, on which a slitting position is in contact with a battery separator original sheet, affects fuzziness that occurs at the slit part of the separator and (ii) the fuzziness can be effectively suppressed by causing the tangent-plane blade edge angle to be in a range of not less than 3° to not more than 35°.

With the method, it is possible to obtain a good-quality slit separator having a small amount of fuzziness at a slit part thereof.

The slit separator production method is preferably configured such that the slitting blade edge angle is not more than 28°.

With the method, it is possible to obtain a good-quality slit separator having a smaller amount of fuzziness at a slit part thereof.

It is more preferable to arrange the method such that the slitting blade edge angle is a range of not less than 5° to not more than 21°.

With the method, it is possible to obtain a superior-quality slit separator having an even smaller amount of fuzziness at a slit part thereof.

The method may be arranged such that the battery separator original sheet has, at the slitting position, a curved surface that is convexed toward the slitting blade.

With the method, the tangent-plane blade edge angle is determined by a length at which the blade edge of the slitting blade is inserted into the curved surface. This allows the tangent-plane blade edge angle to be easily adjusted.

The method may be arranged such that a blade edge of the slitting blade is arc-shaped.

With the method, the tangent-plane blade edge angle Is determined by a length at which the blade edge of the slitting blade is inserted into the battery separator original sheet being conveyed. This allows the tangent-plane blade edge angle to be easily adjusted.

The method may be arranged such that a shape of the blade edge of the slitting blade is plane-symmetrical with respect to a plane, the plane being (i) perpendicular to the tangent plane and (ii) parallel to a direction in which the battery separator original sheet is conveyed.

With the method, it is possible to obtain slit separators whose respective end surfaces, at which the slit separators have been slit, are closer to being uniform.

A separator roll production method in accordance with Referential Aspect 2 of the present invention includes: each of the steps recited in the slit separator production method; and a winding step of winding, around a core, a separator which has been slit.

With the method, a separator roll, which is made up of a core and a separator wound around the core, is obtained. In this case, a slit part of the separator corresponds to a surface of the roll, which surface is located on a side-surface side of the core. By use of the above-described slit separator production method, it is possible to obtain a good-quality slit separator having a small amount of fuzziness at a slit part thereof. This makes it possible to obtain a good-quality separator roll having a surface on which there is a small amount of fuzziness.

A separator slitting method in accordance with Referential Aspect 3 of the present invention includes: a conveying step of conveying a battery separator original sheet which is porous; and a slitting step of slitting the battery separator original sheet by causing a slitting blade to cut into the battery separator original sheet such that a slitting blade edge angle in a tangent plane, on which a slitting position is in contact with the battery separator original sheet, is in a range of not less than 3° to not more than 35°.

A separator slitting apparatus in accordance with Referential Aspect 4 of the present invention includes: a conveying section for conveying a battery separator original sheet which is porous; and a slitting blade for slitting the battery separator original sheet, a blade edge angle in a tangent plane, on which a slitting position of the slitting blade is in contact with the battery separator original sheet, being in a range of not less than 3° to not more than 35°.

[Additional Remarks]

The present invention is not limited to the embodiments, but can be altered by a skilled person in the art within the scope of the claims. An embodiment derived from a proper combination of technical means each disclosed in a different embodiment is also encompassed in the technical scope of the present invention.

Industrial Applicability

The present invention can be used for (i) a method for slitting a film in any direction, (ii) a method for producing a film roll, and (iii) a film slitting apparatus.

REFERENCE SIGNS LIST

1 Lithium-ion secondary battery
3 Lithium ion
4 Heat resistant layer
6 Slitting apparatus (separator slitting apparatus)
7 Cutting device
12 Separator
66 Roller (conveying section)
71 Holder
72,72a through 72d Slitting blade
E,Ea,Ec Blade edge
P Pore
S Original sheet (separator)
S101 Step of conveying separator original sheet, first conveying step
S101a Step of conveying other separator original sheet, second conveying step
S102 Step of slitting separator original sheet
S102a Step of slitting separator original sheet, first slitting step
S102b Step of slitting separator original sheet, second slitting step
T Cross section (tangent plane)
$\theta_1, \theta_{1a}, \theta_4$ Cross-sectional angle
$\theta_2$ Mounting angle
$\theta_{2a}, \theta_{2b}$ Entry angle
$\theta_{2cc}, \theta_{2cd}$ One entry angle
$\theta_3, \theta_{3a}$ Tangent-plane blade edge angle

The invention claimed is:

1. A method for producing a slit separator, comprising:
a first conveying step of conveying a battery separator original sheet which is porous; and
a first slitting step of slitting the battery separator original sheet in a direction of conveyance of the battery separator original sheet by causing a plurality of slitting blades to cut into the battery separator original sheet such that a plurality of tangent-plane blade edge angles are substantially identical with each other,
each of the plurality of tangent-plane blade edge angles being a cross-sectional angle of a corresponding one of the plurality of slitting blades, the corresponding one of the plurality of slitting blades expanding from its edge as a tip so as to have the cross-sectional angle on a plane which includes the battery separator original sheet with which the edge is in contact,
each of the plurality of tangent-plane blade edge angles being in a range of not less than 3° and not more than 35°.

2. The method as set forth in claim 1, wherein in the first slitting step, a film obtained by slitting the battery separator original sheet is obtained by slitting with use of adjacent two slitting blades out of the plurality of slitting blades.

3. The method as set forth in claim 1, wherein the plurality of slitting blades are attached to a single axis positioned fixedly with respect to the battery separator original sheet.

4. The method as set forth in claim 3, wherein at least one of the plurality of slitting blades is a flat blade and is rotatably attached to the axis.

5. The method as set forth in claim 4, wherein a rotational angle of said at least one slitting blade rotatably attached to the axis is limited by a stopper positioned fixedly with respect to the axis.

6. The method as set forth in claim 1, wherein
in the first slitting step, two or more slitting blades being a part of the plurality of slitting blades slit the battery separator original sheet, and
the method further comprises:
a second conveying step of conveying a further battery separator original sheet which is porous and has a same width as that of the battery separator original sheet; and
a second slitting step of slitting the battery separator original sheet by causing said two or more slitting blades to cut into the further battery separator original sheet such that tangent-plane blade edge angles of said two or more slitting blades in a tangent plane are substantially identical with each other, the tangent plane being a plane which includes the further battery separator original sheet.

7. The method as set forth in claim 6, further comprising the step of replacing the plurality of slitting blades all at once.

8. The method as set forth in claim 1, wherein the battery separator original sheet contains inorganic filler.

9. The method as set forth in claim 1, wherein in the first slitting step, the battery separator original sheet is slit by causing the plurality of slitting blades, each of which has a cross sectional angle $\theta 1$ within a range that meets Formula (5) below and has a mounting angle $\theta 2$ within a range that meets Formula (5) below, to cut into the battery separator original sheet, with the plurality of tangent-plane blade edge angles being $\theta 3$ within a predetermined range $$\tan(\theta 3/2) = \sin(\theta 2) \cdot \tan(\theta 1/2) \qquad \text{Formula (5).}$$

10. The method as set forth in claim 1, wherein the range of not less than 3° and not more than 35° of each of the plurality of tangent-plane blade edge angles is a range that enables the method to produce a good-quality slit separator with a small amount of fuzziness at a slit part thereof.

11. A method for producing a separator roll, comprising:
each of the steps recited in the method as set forth in claim 1; and
a winding step of winding, around a core, a separator obtained by slitting the battery separator original sheet.

* * * * *